(12) United States Patent
Warren et al.

(10) Patent No.: US 7,743,178 B2
(45) Date of Patent: Jun. 22, 2010

(54) METHOD AND APPARATUS FOR SATA TUNNELING OVER FIBRE CHANNEL

(75) Inventors: Bruce Gregory Warren, Costa Mesa, CA (US); Curtis Edward Nottberg, Costa Mesa, CA (US); Carl Joseph Mies, Costa Mesa, CA (US); Kevin Dale Bowman, Costa Mesa, CA (US); Noumaan Ahmed Shah, Costa Mesa, CA (US); Gary Lynn Franco, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 375 days.

(21) Appl. No.: 11/104,341

(22) Filed: Apr. 11, 2005

(65) Prior Publication Data
US 2006/0230218 A1 Oct. 12, 2006

(51) Int. Cl.
*H04L 5/00* (2006.01)
(52) U.S. Cl. .............................. 710/30; 710/33; 710/5; 710/74; 370/466
(58) Field of Classification Search .................. 710/11, 710/62, 100, 269, 5; 709/230, 236; 370/465
See application file for complete search history.

(56) References Cited

U.S. PATENT DOCUMENTS

| 6,425,034 | B1 * | 7/2002 | Steinmetz et al. ........... 710/305 |
| 6,732,104 | B1 * | 5/2004 | Weber ......................... 707/10 |
| 7,043,578 | B2 * | 5/2006 | Hufferd ....................... 710/105 |
| 7,103,686 | B1 * | 9/2006 | Lin et al. ..................... 710/100 |
| 7,120,705 | B2 * | 10/2006 | Arai et al. ....................... 710/5 |
| 7,219,183 | B2 * | 5/2007 | Pettey et al. ................. 710/316 |
| 7,376,147 | B2 * | 5/2008 | Seto et al. ................... 370/465 |
| 7,580,406 | B2 * | 8/2009 | Shah et al. .................. 370/389 |

(Continued)

FOREIGN PATENT DOCUMENTS

WO    WO-2006/110845 A2    10/2006

(Continued)

OTHER PUBLICATIONS

Thornburgh, Fibre Channel for Mass Storage, Apr. 1999, Prentice Hall, pp. 1-155.*

(Continued)

*Primary Examiner*—Henry W. H. Tsai
*Assistant Examiner*—Cheng-Yuan Tseng
(74) *Attorney, Agent, or Firm*—Morrison & Foerster LLP

(57) ABSTRACT

A system for enabling SATA drives to be utilized in FC SANs is disclosed. To send data to a SATA drive over a FC SAN, a host sends SCSI commands encapsulated in FC frames over a standard FC link to a Fibre Channel Attached SATA Tunneling (FAST) RAID controller, where the SCSI commands are de-encapsulated from the FC frames and translated to SATA FISs. The SATA FISs are thereafter encapsulated into FC frames. The IOC that performs these functions is referred to as a FAST IOC. The SATA-encapsulated FC frames are sent to multiple disk drive enclosures over another standard FC link. The FC frames are de-encapsulated by FAST switches in disk drive enclosures to retrieve the SATA FISs, and the SATA FISs are sent to the SATA drives over a SATA connection.

17 Claims, 18 Drawing Sheets

U.S. PATENT DOCUMENTS

| | | | |
|---|---|---|---|
| 7,644,191 B2 * | 1/2010 | Nicolson et al. | 710/5 |
| 2004/0010612 A1 * | 1/2004 | Pandya | 709/230 |
| 2005/0102468 A1 | 5/2005 | Delaney et al. | |
| 2005/0108476 A1 * | 5/2005 | Tanaka et al. | 711/114 |
| 2006/0168371 A1 * | 7/2006 | Chiu | 710/62 |
| 2006/0242312 A1 * | 10/2006 | Crespi et al. | 709/230 |

FOREIGN PATENT DOCUMENTS

WO    WO-2006/110845 A3    10/2006

OTHER PUBLICATIONS

SATA, Serial ATA: High Speed Serialized AT Attachment, 2003, SATA, pp. 1-311.*

* cited by examiner

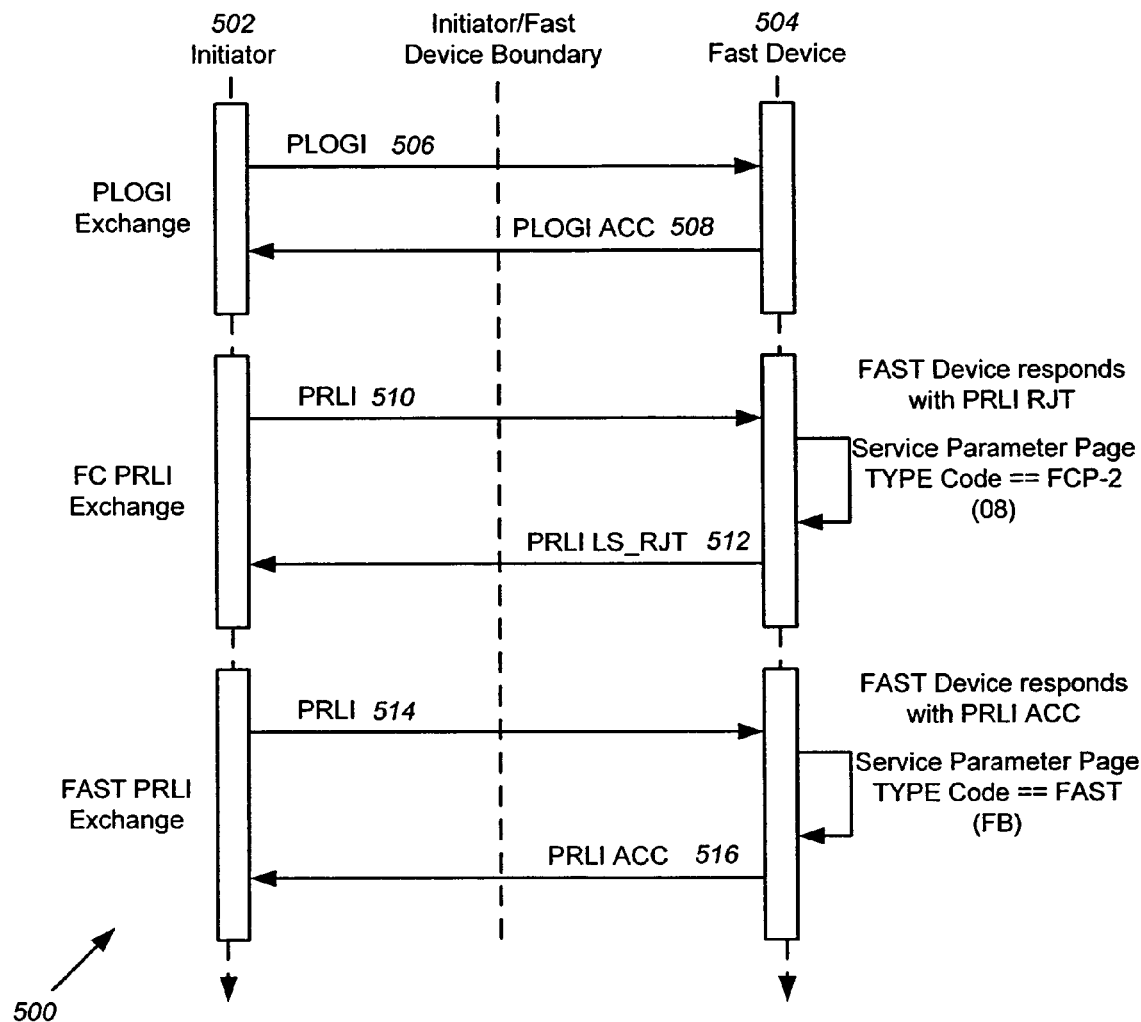

PRLI Contents

| | |
|---|---|
| TYPE Code: | FAST |
| TYPE Code Extension: | 0 |
| Orig Process_Assoc Validity: | 0 |
| Resp Process_Assoc Validity: | 0 |
| Establish Image Pair: | XXXX |
| Originator Process_Associator: | 0 |
| Responder Process_Associator: | 0 |
| Initiator Function: | XXXX |
| Target Function: | XXXX |

FAST = Vendor Specific TYPE Value (E0-FF)
XXXX = As defined in FC-FS and FCP-2

NOTE: FAST capable Initiator must complete PLOG/PRLI ELS sequence successfully before being allowed to communicate with the FAST Device.

PRLI ACC Contents

| | |
|---|---|
| TYPE Code: | FAST |
| TYPE Code Extension: | 0 |
| Orig Process_Assoc Validity: | 0 |
| Resp Process_Assoc Validity: | 0 |
| Establish Image Pair: | XXXX |
| Accept Response Code: | XXXX |
| Originator Process_Associator: | 0 |
| Responder Process_Associator: | 0 |
| Initiator Function: | XXXX |
| Target Function: | XXXX |

FAST = Vendor Specific TYPE Value (E0-FF)
XXXX = As defined in FC-FS and FCP-2

FIG. 5

METHOD AND APPARATUS FOR SATA TUNNELING OVER FIBRE CHANNEL

FIELD OF THE INVENTION

This invention relates to communications over Storage Area Networks (SANs), and more particularly, to the encapsulating of Serial Advanced Technology Attachment (SATA) Frame Information Structures (FISs) into Fibre Channel (FC) frames for transmission over FC SANs that utilize SATA disk drives.

BACKGROUND OF THE INVENTION

Conventional FC SANs. FC is a serial transport protocol that was developed for carrying other transport protocols. In conventional SANs, FC carries Small Computer System Interconnect (SCSI), which is a parallel protocol. In other words, parallel SCSI commands are encapsulated within FC frames and transported over FC links in FC SANs.

FIG. 1 illustrates an exemplary conventional SAN 100 which includes one or more hosts 102 connected to two Redundant Array of Independent Disks (RAID) controllers 104 over a network 106. The host side of the RAID controllers 104 is referred to as the "front end" 112. In conventional SANs 100, the RAID controllers 104 are connected to a plurality (e.g. 30 to 100) of drives in disk drive enclosures 108 and send and receive FC frames over a FC link 110. The disk drive enclosure side of the RAID controllers 104 is referred to as the "back end" 114. In conventional SANs 100, the disk drives within the disk drive enclosures are FC drives 118 that operate according to the SCSI protocol.

FC-ATA SANs. FC drives offer the best performance, but are expensive. Therefore, less expensive (but lower performance) Advanced Technology Attachment (ATA) drives of the type commonly used in desktop or notebook computers have been used in place of FC drives, or along with FC drives in what is referred to as tiered storage. The ATA drives may be Parallel Advanced Technology Attachment (PATA) or Serial Advanced Technology Attachment (SATA) drives. FIG. 1 illustrates a SAN in which one of the disk drive enclosures 108 contain PATA drives 120 rather than FC drives. PATA drives require a FC-to-PATA bridge 116, which is relatively expensive and effectively makes the PATA disk drives 120 appear as SCSI drives to the RAID controller 104. In other words, the RAID controllers 104 send FC encapsulated SCSI commands to the disk drive enclosures, and receive FC encapsulated SCSI commands from the disk drive enclosures, and the conversion between FC and PATA occurs in the bridge 116, transparent to the RAID controllers 104 and the rest of the SAN 100. Because PATA drives are different from FC drives in terms of interfaces, error recovery and discovery, FC-to-PATA bridges are designed to be specific to a particular type of PATA drive. As a consequence, every time a new PATA drive is developed, the FC-to-PATA bridge may require modification.

In disk drive technology, as well as in transport technology, there are speed and cable distance benefits to utilizing serial protocols rather than parallel protocols. SATA drives, the serial counterpart to PATA drives, are therefore now being contemplated as an upgrade to PATA. SATA was envisioned for consumer applications.

SAS-SATA SANs. FC, as described above, is a serial transport protocol that has historically been used for carrying the SCSI protocol in enterprise applications over large connectivity spaces. Serial Attached SCSI (SAS) is a relatively new serial protocol intended to replace parallel SCSI within an enterprise host or computer. Both FC and SAS use 8b10b encoding and similar ordered sets, and both are high performance and expensive. SAS includes several protocols. One such protocol is the Simple Management Protocol (SMP), a protocol for device-to-device management that enables each entity to communicate with other entities regarding management aspects.

To take advantage of lower cost SATA drives, SATA drives have been utilized alongside higher cost, higher performance SAS drives in SAS networks (a SAS network including the initiator, target, and any attached expander devices). As mentioned above, tiered storage is the concept of having different types of drives in the same network (e.g. some 73 GByte FC drives and some 200-500 GByte SATA drives), each for a different purpose. FIG. 2 illustrates a SAS SAN incorporating tiered storage, where SATA drives are utilized in addition to SAS drives. As illustrated in FIG. 2, within a host 200, a motherboard (MB) 202 includes a processor 204, an embedded SAS Input/Output Controller (IOC) 206, and a SAS expander 208 to provide multiple ports to the MB 202 and multiple connections to drives. Connected to the host 200 are SAS drives 210 and SATA drives 212 within the host 200. In addition, the host 200 is connected to enclosures 214 containing both SAS and SATA drives. To accommodate tiered storage, another protocol was developed within SAS, the SATA Tunneling Protocol (STP), which enables lower cost SATA drives to be employed in SAS systems.

Unlike FC, which is a loop technology where drives share a common infrastructure, SAS is a point-to-point technology. SAS employs a shared infrastructure with the ability to create a point-to-point connection between two devices through which data may be transferred without interruption. Similar to FC, SAS goes through a discovery process where the first SAS entity that is discovered is the SAS expander 208. The number of ports in the SAS expander 208 is also discovered. Each port is then discovered in turn by the initiator, and the device connected to each port is determined (e.g. a SAS device). For example, if a SAS discovery ordered set is sent to a SAS drive, the SAS drive returns an affirmative response indicating that it is a SAS drive. However, if the SAS ordered set is sent to a SATA drive, nothing is returned. Similarly, if a SATA discovery ordered set is sent to a SATA drive, the SATA drive returns an affirmative response, indicating that it is a SATA drive. From that point forward, the initiator communicates with the device as a SATA device.

In the simplified ladder diagram of FIG. 2 showing a half-duplex operation, SAS ordered sets are sent between the initiator 200 and the enclosure expander. The enclosure expander makes a connection between the initiator 200 and the correct target. Once the connection is created, SATA ordered sets 216 flow between a host or initiator 200 and a target 218. The SAS communications effectively build a point-to-point connection between the SAS IOC 206 and a target (e.g. SATA drive 212), and thereafter SATA ordered sets are passed across this connection that are natively understood by the SATA drive 212. Intermixed with the SATA ordered sets will be SATA File Information Structures (FISs) flowing from the initiator 200 to the target 218 (see reference character 220), and from the target 218 to the initiator 200 (see reference character 222) according to STP.

Because of the reliability, speed and cable distance benefits inherent in FC, and the lower cost of SATA drives, there is a need to utilize SATA drives in FC SANs that have historically utilized SCSI drives. Conventional solutions for utilizing SATA drives in FC SANs provide a conversion interface, or bridge, between the FC link and the SATA device. These conversion interfaces terminate all FC exchanges and initiate corresponding SATA exchanges at or near the targets. These bridging solutions require a bridge unit per SATA device or a bridge per SATA enclosure and as a result become a prohibitively expensive solution in a SAN environment. In addition, all error cases must be dealt with at or near the drive level. In the other direction, SATA exchanges are also terminated and FC exchanges are created and sent to the FC initiator. Because the FC to SATA translation is performed independently at each SATA drive or enclosure, there is no clean way of performing this conversion and the approach is prone to performance and interoperability issues. Error recovery in FC is also much different than SATA. The interface must now deal with the differences, which adds complexity and additional cost to the system.

Therefore, there is a need to be able to utilize SATA drives while preserving the FC infrastructure and FC transport to the greatest extent possible to minimize the changes needed to legacy FC SANs. There is a further need to move the translation and protocol handling into the RAID controllers, which is a much more cost effective solution because the RAID controllers can perform the protocol translation for a large number of drives.

SUMMARY OF THE INVENTION

Embodiments of the present invention are directed to enabling SATA drives to be utilized in FC SANs. As mentioned above, SATA drives are also now being contemplated as an upgrade to PATA in FC SANs. FC remains advantageous as a transport protocol because it can be transmitted over long distances (thousands of meters) compared to SATA (one meter), and 126 drives can be addressed per FC loop or greater than 16 million drives in FC fabrics. Therefore, to send data to a SATA drive over a FC SAN, a host sends SCSI commands encapsulated in FC frames over a standard FC link to a Fibre Channel Attached SATA Tunneling (FAST) enabled RAID controller, where the SCSI commands are de-encapsulated from the FC frames and translated to SATA FISs. The SATA FISs are then encapsulated into FC frames. The IOC that performs these functions is referred to as a FAST IOC. The SATA-encapsulated FC frames are sent to multiple disk drive enclosures over another standard FC link. The FC frames are then de-encapsulated by FAST switches in disk drive enclosures to retrieve the SATA FISs. SATA FISs are up to 8 k bytes in size and FC Frames payloads are a maximum or 2 k bytes. Since a SATA FIS can be larger than the maximum FC frame size, multiple frames are used to send SATA FISs as required. On the FAST switches the multiple frames are received and the SATA FIS is reconstructed and the SATA FISs are sent to the SATA drives over a SATA connection. The sequence count of each frame is incremented sequentially to identify SATA devices that are FAST-enabled by the FAST switches are referred to herein as FAST devices.

The only elements in the FC SAN which require modification to support the FAST protocol are the FAST IOC and FAST switch. Existing investments in drivers and FC infrastructure can be preserved, although in alternative embodiments the FAST IOC functionality could be implemented in the IOC's drivers. The existing FC infrastructure can remain unmodified while new SATA connect capabilities are added to the SAN.

BRIEF DESCRIPTION OF THE DRAWINGS

FIG. 5 is an exemplary illustration of a discovery sequence between a FAST-compatible initiator and a FAST device according to embodiments of the present invention.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Figure 1:
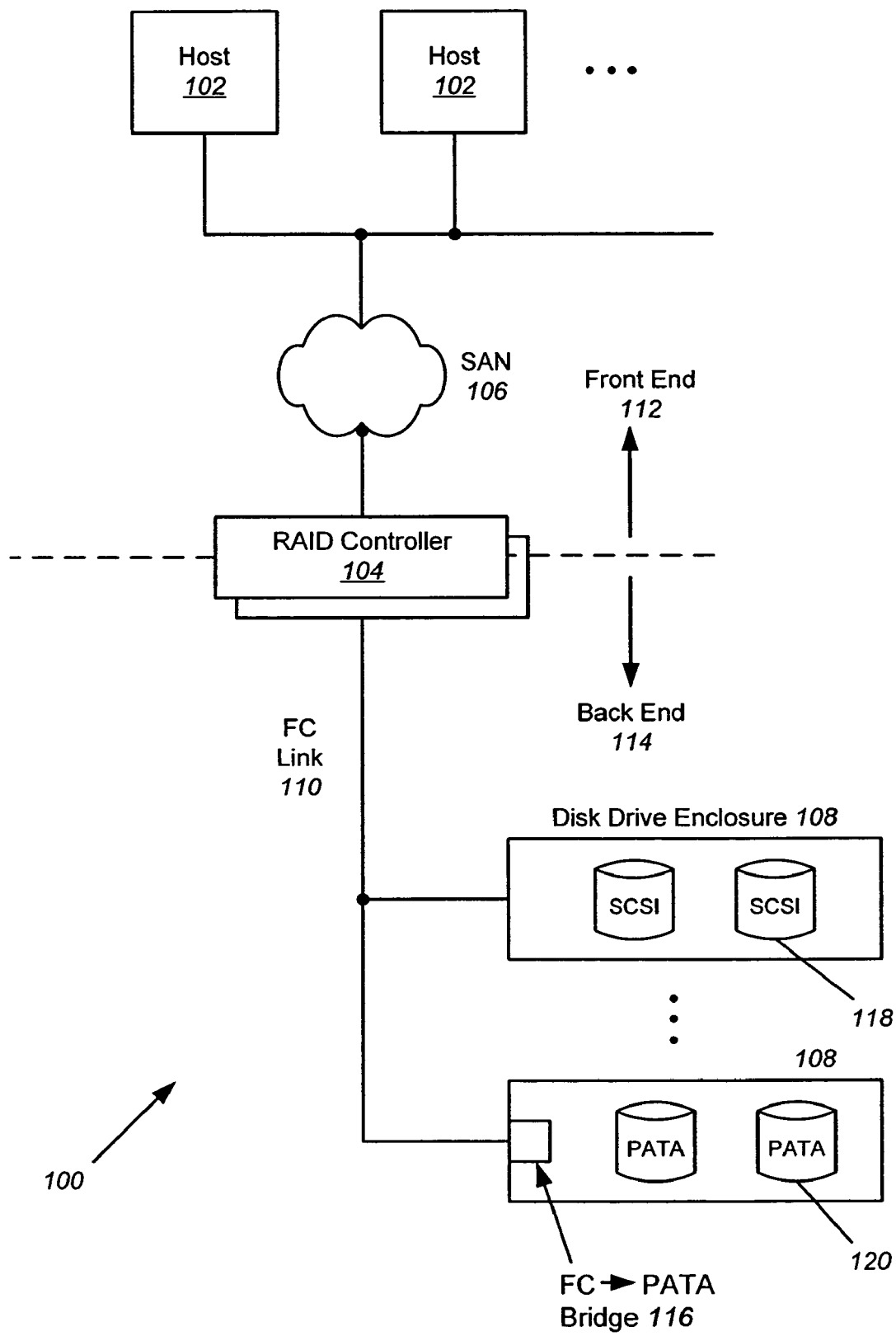
FIG. 1 is an exemplary illustration of a SAN including one or more hosts connected to two RAID controllers and two disk drive enclosures over a network, with one of the enclosures including a FC-to-PATA bridge.
Figure 2:
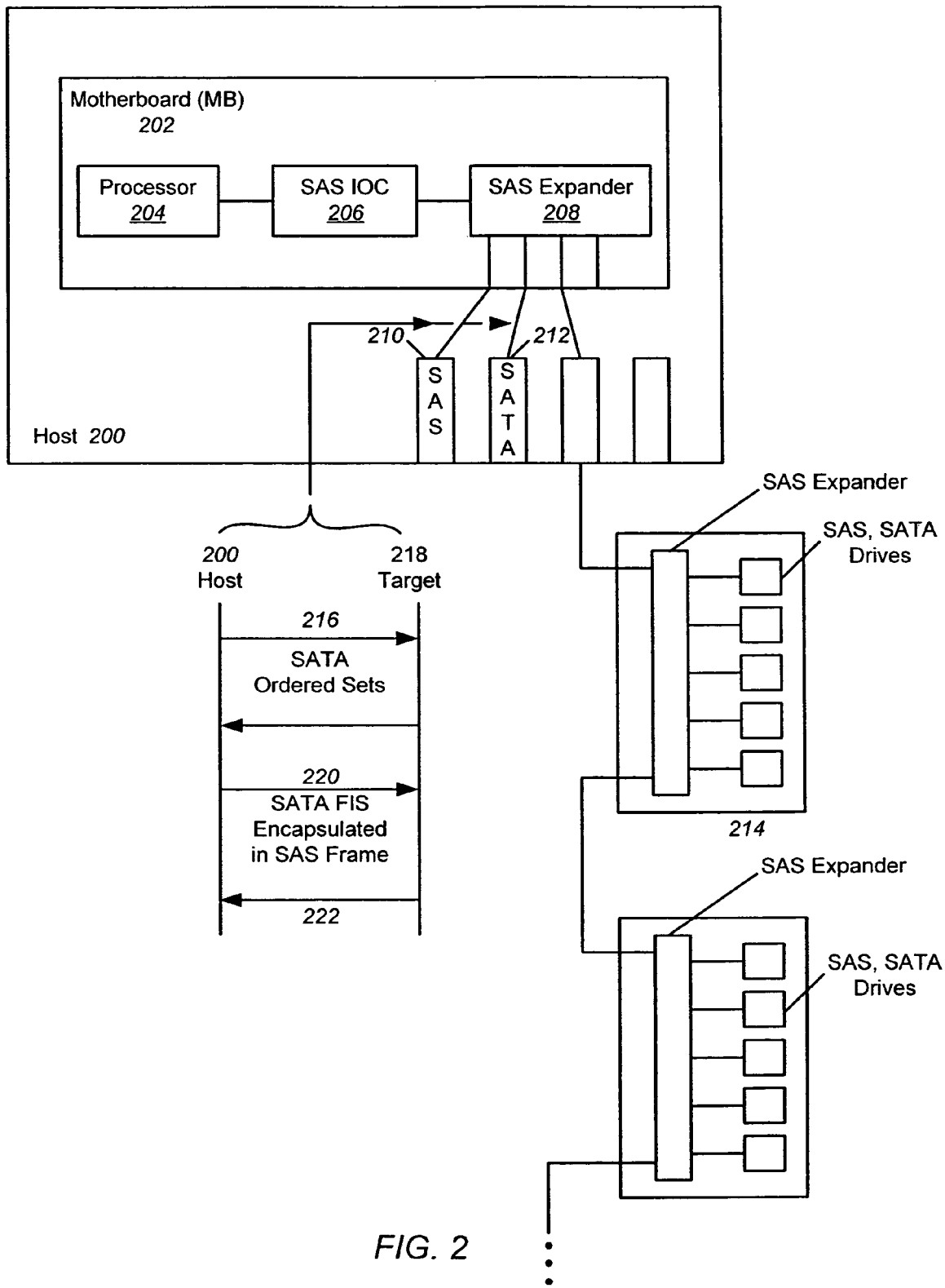
FIG. 2 is an exemplary illustration of a SAS network within a host incorporating tiered storage, where SATA drives are utilized in addition to SAS drives.
Figure 3:
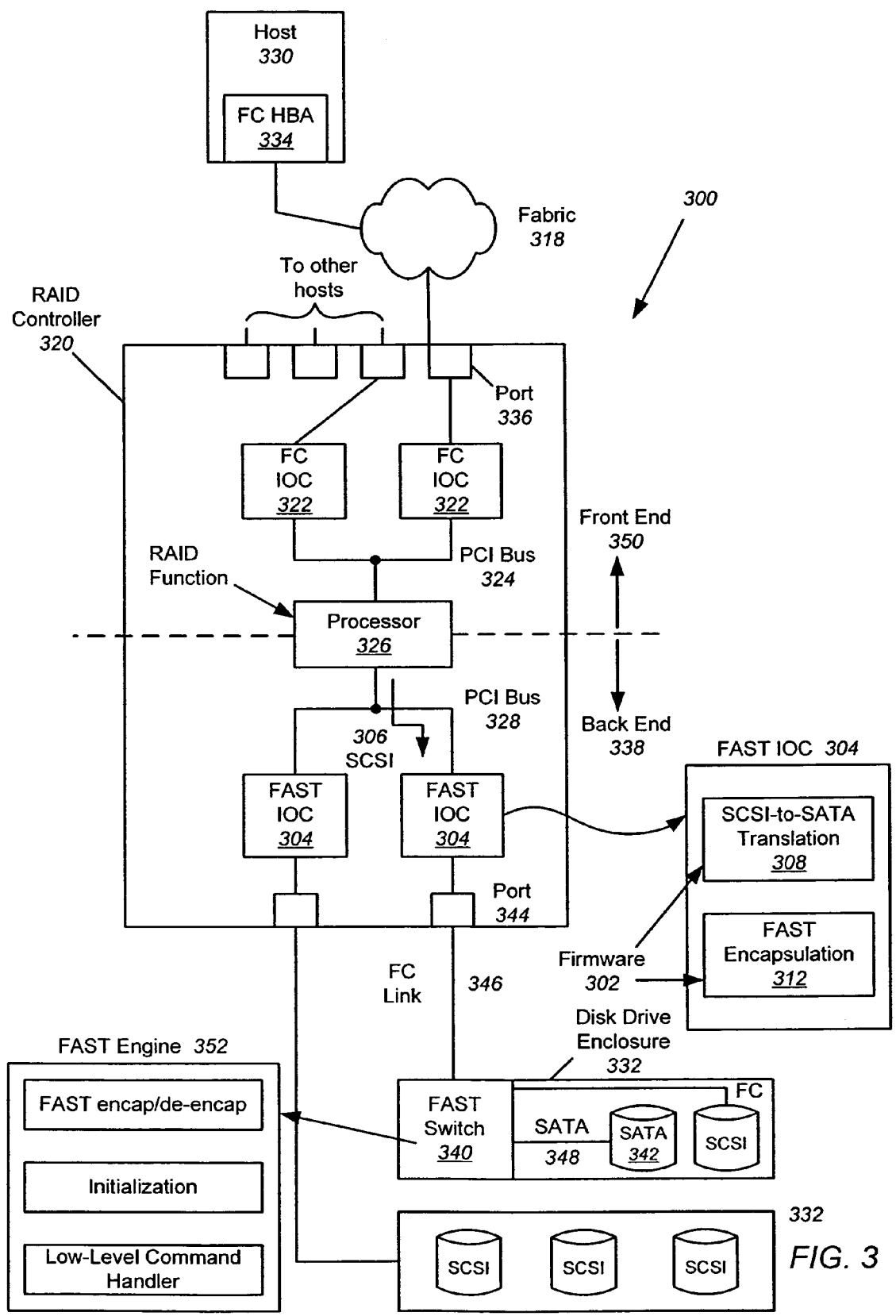
FIG. 3 is an exemplary illustration of a SAN including a host, a RAID controller including a FAST IOC, and a disk drive enclosure containing SATA drives and a FAST switch according to embodiments of the present invention.

FC-SATA SANs. FIG. 3 illustrates a SAN 300 including SATA drives and a conversion from FC to SATA according to embodiments of the present invention. When SCSI commands are to be sent from host 330 to SATA drives 342 in disk drive enclosure 332, a FC HBA 334 in host 330 sends FC frames encapsulating the SCSI commands out over the fabric 318 to a RAID controller 320, where they are received in one of the ports 336 on the RAID controller 320. Note that the ports 336 may also be connected to other hosts in the SAN 300. Note also that in alternative embodiments, a RAID controller need not be employed, but any device providing an IOC function may be utilized. The FC frames are then routed to FC IOCs 322 in the RAID controller 320. The SCSI commands within the FC frames are then de-encapsulated by the FC IOCs 322 and passed over a Peripheral Component Interconnect (PCI) bus 324 to a processor 326, which performs the RAID function and creates multiple commands to satisfy the received SCSI command. The created commands may be SCSI commands or SATA commands and will be sent to one or more disk drives within enclosures 332.

The SCSI commands 306 are then passed from the processor 326 over a custom interface 328 (which may include, but is not limited to a PCI bus) to FAST-enabled IOCs 304. The FAST IOCs 304 contain the same hardware as conventional FC IOCs, but include additional firmware 302 to allow it to handle both FC and SATA according to embodiments of the present invention. SCSI commands 306 from processor 326 are converted in SCSI-to-SATA translation firmware 308 to SATA FISs. In alternative embodiments, the SCSI-to-SATA translation may be performed by the processor 326 rather than in the FAST IOC 304. The SATA FISs are then encapsulated by FAST encapsulation firmware 312 into FC frames. In particular, each 8 kByte SATA FIS is encapsulated into four 2 kByte FC frames along with modifications to the header in the FC frames that enable the SATA-encapsulated FC frames to traverse a FC link. The FAST IOC 304 then sends the FC frames out over a FC link 346 via a FC port 344.

The FC frames are received by FAST switches 340 in disk drive enclosures 332, which are utilized instead of FC-to-SATA bridges. Because FC-to-SATA bridges are no longer required, the problem of new SATA drive types requiring reworking the FC-to-SATA bridge disappears. The drives can be presented as pure ATA throughout the SAN, while using FC as the transport. The FAST switches 340 include a FAST engine 352, which de-encapsulates the FC frames to retrieve the SATA FISs, handles initialization, sequences, exchanges, and all of the low-level FC commands and structures. Note that conventional FC switches only route frames between the initiator and target (which handle all exchanges themselves). However, because SATA drives do not utilize the concept of exchanges, the FAST switches in embodiments of the present invention are responsible for creating and terminating exchanges. The de-encapsulated SATA FISs are then communicated over a pure SATA connection 348 to the SATA drives 342.

Note that the front end devices 350 and the SAN 300 are not aware of the existence of the back end devices 338. For example, when host 330 sends SCSI data to a particular logical drive, it acts as a front-end initiator and sends the FC-encapsulated SCSI data to a virtual address associated with one of the ports 336 and a FC IOC controller 322 connected to that port 336, which acts as a front-end target. Unknown to the host 330, the processor 326 performing the RAID function identifies multiple addresses in multiple disk drive enclosures 332, and sends the SCSI data to one or more FAST IOCs 304, which act as back-end initiators. The FAST IOCs 304 translate the SCSI data into SATA FISs, encapsulate the SATA FISs into FC frames, and send the FC frames to those multiple addresses in multiple disk drive enclosures 332, which act as back-end targets. This process is referred to as virtualizing the storage. The processor 326 maintains the association between the virtual address and the addresses in the multiple disk drive enclosures, so that when a request to read that data is received from the host 330, the data can be pulled out of the multiple disk drive enclosures and sent back to the host 330.

The reverse of the above-described process is employed when a SATA drive 342 sends SATA FISs back to the host 330. Thus, when SATA FISs are to be sent from a SATA drive 342 to the RAID controller 320, the SATA FISs are sent over the SATA connection 348 to the FAST switch 340, where it is encapsulated in FC frames. The FAST switch 340 then transmits the FC frames over the FC link 346 to the RAID controller 320, where they are received by the FAST IOC 304. The FAST IOC 304 receives the FC frames, de-encapsulates the frames to retrieve the SATA FISs, and performs a SATA to SCSI translation 308 so that the RAID controller will see the target drive 342 as a SCSI device. The SCSI commands are sent to the processor 326 over PCI bus 328, which performs the RAID function and identifies the hosts (initiators) for which the SCSI data is destined. The SCSI data is then sent to the FC IOCs 322 over PCI bus 324, where they are encapsulated into FC frames and sent to the appropriate hosts over the fabric 318. The hosts then de-encapsulate the FC frames to retrieve the SCSI commands.

The benefit of performing the encapsulation/de-encapsulation and the SATA/SCSI translation in the FAST IOC 304 is that other than the addition of the FAST IOC 304, legacy RAID controllers 320 need not be changed to support SATA commands. Because the RAID function implemented by processor 326 has been extensively developed for FC drives implementing the SCSI protocol, embodiments of the present invention retain the FC link 346 between the RAID controller 320 and the multiple disk drive enclosures 332, even though the FC frames are now encapsulating SATA FISs. The conversion from FC to SATA is pushed down to the FAST switches 340 in the disk drive enclosures 332. However, in alternative embodiments, the conversion from SCSI to SATA could occur in the FAST IOCs 304 or even in the processor 326. In either case, the FAST IOCs 304 would then communicate SATA FISs to the disk drive enclosures 332 over a pure FC connection. In general, the SCSI/SATA translation and FAST encapsulation could occur anywhere on the initiator side of a FC link, while the FAST de-encapsulation/encapsulation could occur anywhere on the target side of the FC link.

A primary difference between SAS-SATA SANs described above and embodiments of the present invention is that in SAS-SATA SANs, there is a mixture of SATA FISs and SAS in the interconnect, while in the present invention, everything in the interconnect is FC. There are no SATA FISs, just FC frames with SATA FISs encapsulated within them.

In alternative embodiments of the present invention, a host may encapsulate SATA FISs in FC frames and pass these frames to a RAID controller, where the SATA FISs may either be de-encapsulated, virtualized and re-encapsulated into FC frames destined for multiple SATA drives in the back end, or simply passed through the RAID controller and sent directly to SATA drives through the FC network.

Figure 4:
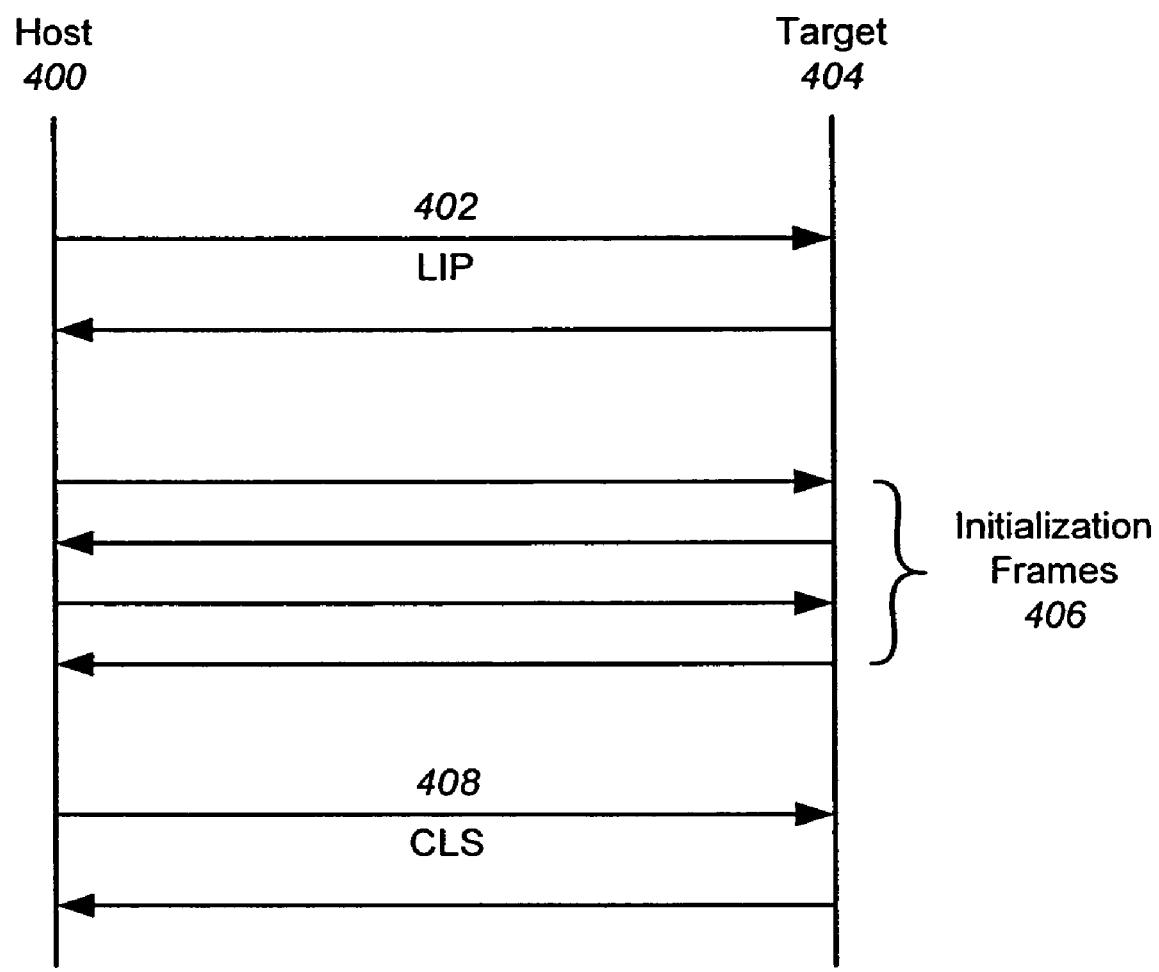
FIG. 4 is an exemplary illustration of a sequence or ladder diagram for a FC discovery process where LIP ordered sets are followed by a series of initialization frames and CLS ordered sets. This is a standard FC T-11 initialization sequence.

FC discovery. As illustrated in the sequence or ladder diagram of FIG. 4, a FC discovery process is started when a host or initiator 400 first sends a Loop Initialization Primitive (LIP) cycle ordered set 402 to a target 404, which then responds with further ordered sets. The LIPs are followed by a series of initialization frames 406, which are followed by a CLoSe (CLS) ordered set 408. At the conclusion of this process, all devices on the SAN know the addresses of all other devices on the SAN.

FIG. 5 illustrates a discovery sequence 500 between a FAST-compatible initiator 502 (e.g. a FAST IOC 304 in FIG. 3) and a FAST device 504 (e.g. disk drive enclosure 332 in FIG. 3) according to embodiments of the present invention. In FIG. 5, a N_Port LOGIn (PLOGI) frame 506 is sent from the initiator 502 to the device 504 to inquire about the basic capabilities of the device. When the device 504 returns a PLOGI accept frame 508, the initiator 502 will know the capabilities of the device, and know that the device is one with which the initiator can communicate. The initiator then sends a FC PRocess LogIn (PRLI) frame 510 to the device, requesting the characteristics of the device (i.e. what characteristics the device is capable of, is the device an initiator, a target, etc.). Because the device 504 in FIG. 5 is a FAST device and not a SCSI device, a FC PRLI reject frame 512 is returned to the initiator 502, indicating to the initiator that the device is not a SCSI device. The benefit of this indication is that non-FAST initiators will thereafter never send commands to the FAST device 504 or receive FC-encapsulated SATA FISs from the FAST device. If a FC PRLI reject frame 512 is received, initiators that are not FAST-compatible will not do anything further.

However, initiators 502 that are FAST-compatible will then send a FAST PRLI frame 514 to the device 504, requesting the FAST characteristics of the device. It should be understood that a capability within FC referred to as a vendor-unique field may be used to identify the FAST PRLI frame 504. In alternative embodiments, a command code may be assigned to the FAST PRLI frame 504 to make it a normal FC command. Because the device 504 is a FAST device, a FAST PRLI accept frame 516 will be returned to the initiator 502, indicating to the initiator that the device is a FAST device. At this point the initiator 502 knows that if FC frames are received from a target that returned a FC PRLI accept frame 512, the frames contain encapsulated SCSI commands, and if FC frames are received from a target that returned a FAST PRLI accept frame 516, the frames contain encapsulated SATA FISs. Note that each pair of frames in FIG. 5 are referred to as exchanges.

By way of comparison with SATA tunneling in SAS, the type of connection is detected is SAS during out-of-band signaling, and it is automatically configured to be either an STP or SAS interface. In SAS, the link is turned off for a period of time, and an envelope detector is used to determine periods of activity when data is being sent, and where there is inactivity, a few commands are sent, such as reinitialize (which is like a LIP in FC), wake up, power down, a signature frame is sent with device specific information, etc. This same out of band signaling is used in the embodiments of the present invention to initialize the SATA targets.

Exchange establishment. A FC exchange is a mechanism that two FC ports use to identify transactions between them. An N_Port may have multiple exchanges open simultaneously, allowing it to multiplex operations and take advantage of the periods of inactivity that occur when the other device is processing/retrieving information. For example, a RAID controller may have multiple front-end hosts asking for data. An initiator on the back end of the RAID controller (e.g. FAST IOC 304 in FIG. 3) may therefore need to request data from a number of different drives, all of which is destined for different hosts on the front end. To allow the initiator to efficiently process the response data and identify the host to which the response data is to be returned, an Originator eXchange IDentifier (OXID) is used. By looking at the OXID in the header of a FC frame being returned by a drive, the initiator knows which host to return the response data.

Figure 6:
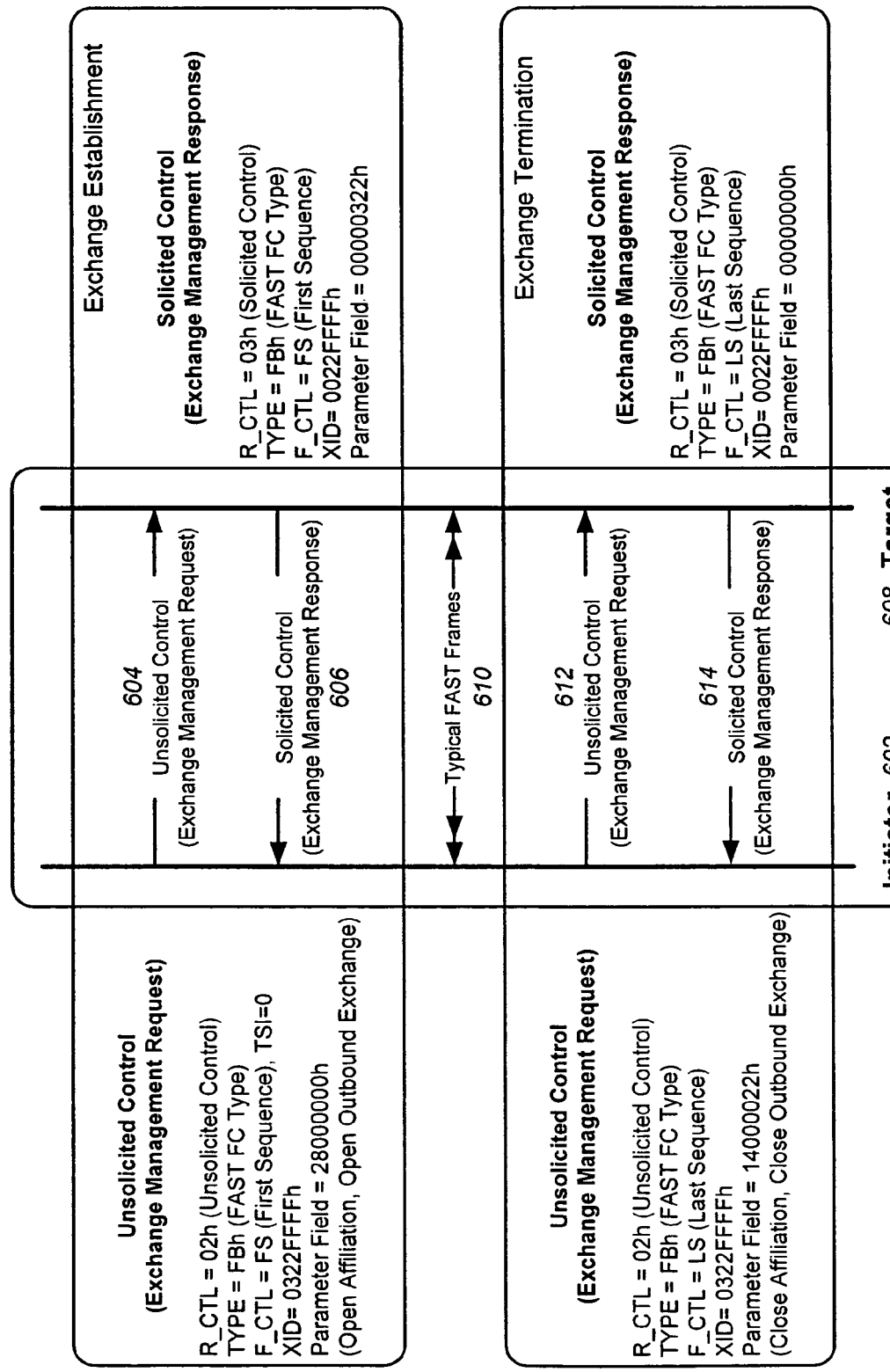
FIG. 6 is an exemplary illustration of exchange pair establishment and termination according to embodiments of the present invention.

FIG. 6 illustrates the establishment of an exchange 600 according to embodiments of the present invention. Dual exchanges are created to minimize the knowledge the switch must have about the protocol being tunneled. An unsolicited control frame 604 is first sent from the initiator 602. The OXID in the header of the unsolicited control frame 604 is the initiator's exchange ID. In the example of FIG. 6, the initiator's OXID is 0322FFFFh. This creates an outbound exchange for frames sent from the initiator to the target. In response, the FAST switch (not the drives) will respond with a solicited control frame 606 that sets up an exchange having a different OXID (e.g. 0022FFFFh in FIG. 6). This OXID creates a different path for the FAST switch to use in communicating with the initiator. In the payload field (see parameter field in FIG. 6), the FAST switch supplies the OXID that was received (0322FFFh), which links the two exchanges together as a pair.

While the dual exchanges are open, multiple SATA-encapsulated FC frames 610 can be passed between the initiator 602 and the target 608. To tear the exchange down, the initiator 602 sends another unsolicited control frame 612 which is an empty frame that has its "last of sequence bit" asserted in the header, and the FAST switch responds with a solicited control frame 614 acknowledging receipt of the last frame in the sequence. The FAST switch is also allowed to tear down the sequence on its own initiative by sending the solicited control frame 614 to the initiator 602 with "last of sequence bit" set. The initiator 602 will respond with an unsolicited control frame 612 with "last of sequence bit" set.

Figure 7:
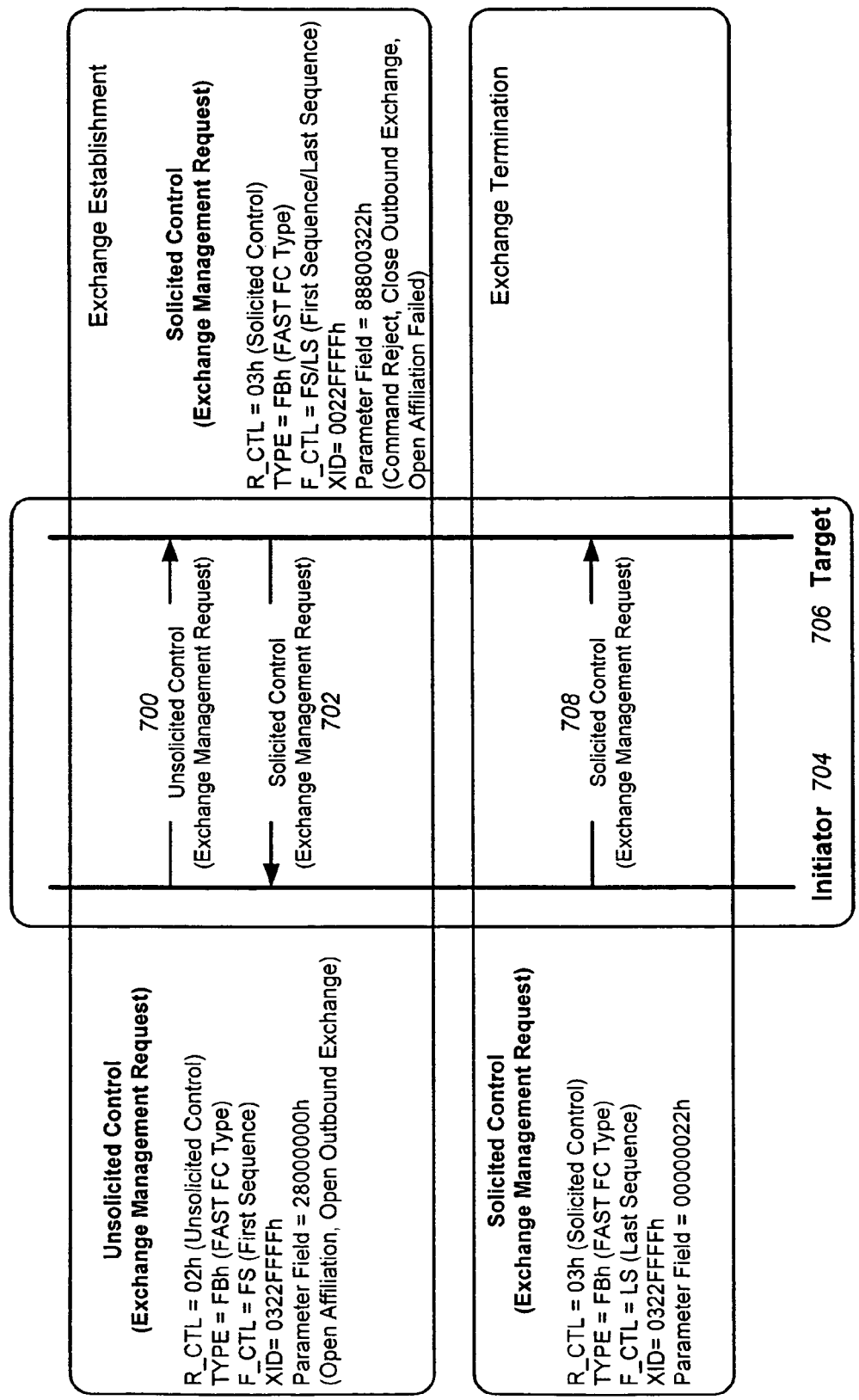
FIG. 7 is an exemplary illustration of exchange establishment rejection and termination according to embodiments of the present invention.

Referring now to FIG. 7, suppose an initiator 704 is communicating with a drive 706, and the initiator has created an exchange pair with the drive. Because SATA drives currently only accept a single outstanding I/O request at a time, other initiators may have outstanding I/O requests for that drive. If a second initiator wants to establish an exchange with drive 706, it will send the FAST switch associated with that drive an unsolicited control frame 700 with a unique OXID and a different source address. The FAST switch will respond with an unsolicited control connection reject 702, which closes the outbound exchange for the second initiator. This is an indication that the drive 706 is busy and already has an outstanding I/O request and an open exchange, so the second initiator cannot talk to that drive at the moment. The second initiator will then send a solicited control frame 708 acknowledging that the exchange is being closed.

Figure 8:
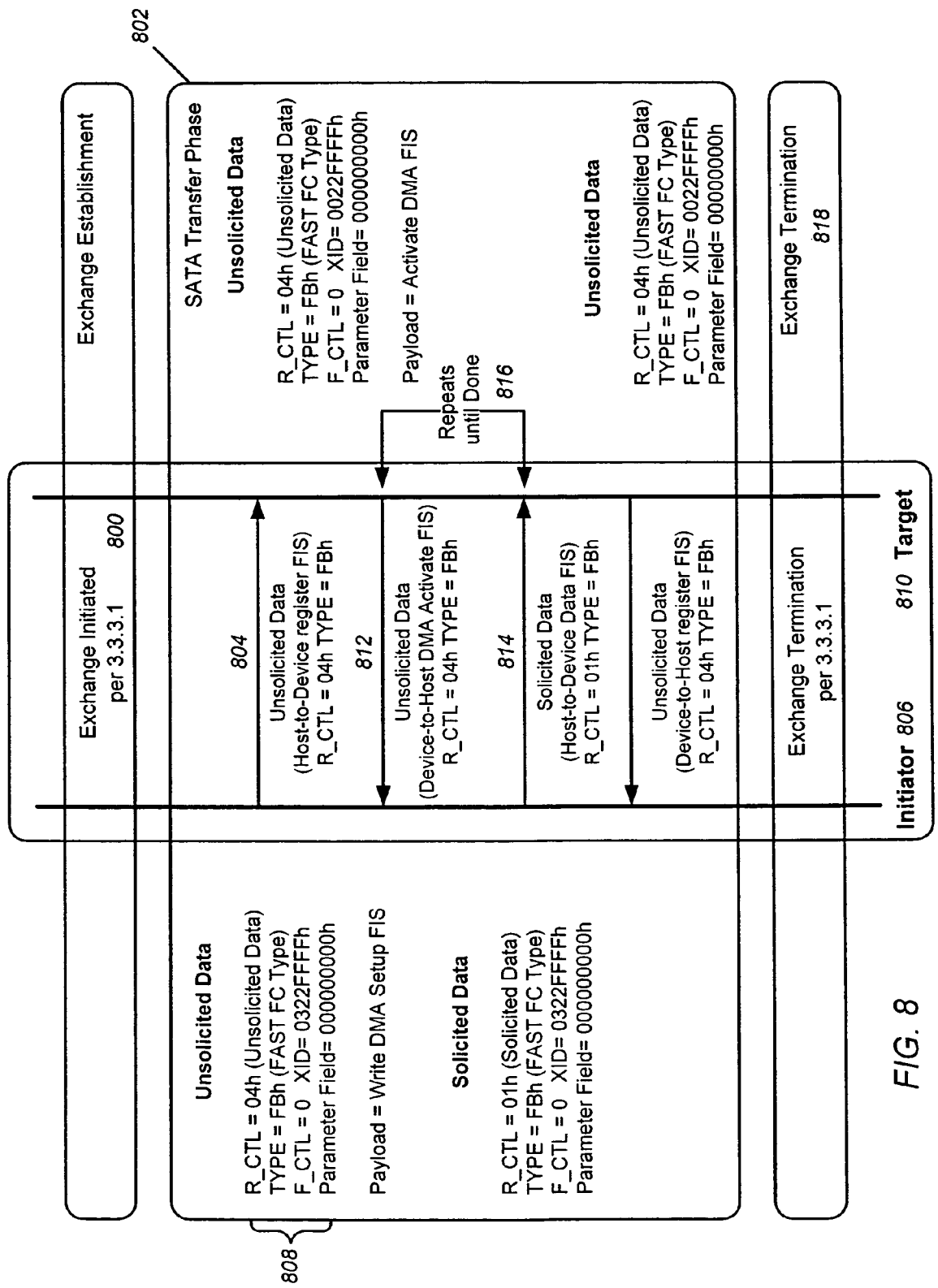
FIG. 8 is an exemplary illustration of how data is transferred according to embodiments of the present invention.

SATA FIS exchanges. FIG. 8 illustrates how data is transferred according to embodiments of the present invention. First, an exchange is established at 800 as described above. Next, a data transfer phase 802 is entered. An unsolicited data frame 804 is sent from the initiator 806 to a target device 810 with a vendor-specific frame type (e.g. FBh in the example of FIG. 8). The frame type indicates the type of traffic. Note that the Routing ConTroL (R_CTL), TYPE, Frame ConTroL (F_CTL) and Parameter fields 808 are information found in a FC frame header. R_CTL is comprised of control bits, and combined with the frame TYPE and the OXID, an initiator can quickly determine how to route and utilize the frame. Data transfer acceleration is possible because devices can look only at the header and determine what to do with the frame (e.g. routing the frame).

The unsolicited data frame 804 contains a host-to-device register FIS, which indicates to the drive whether the request is a read, write, request for status, and the like. The drives have a register interface, and this register is set differently, depending on whether it is a read, a write, a request for status, and the like. FIG. 8 illustrates the generic case where, after the unsolicited data frame 804 with a host-to-device register FIS is sent, the FAST switch responds with an unsolicited data frame 812 containing a device-to-host register FIS. Thereafter, solicited data is transferred at 814. Because the SATA drives are half-duplex, meaning that information can travel in only one direction at a time, a request-response interlock 816 is required multiple times until the data transfer is complete. After the last response is sent, exchange termination 818 is performed as described above.

Figure 9:
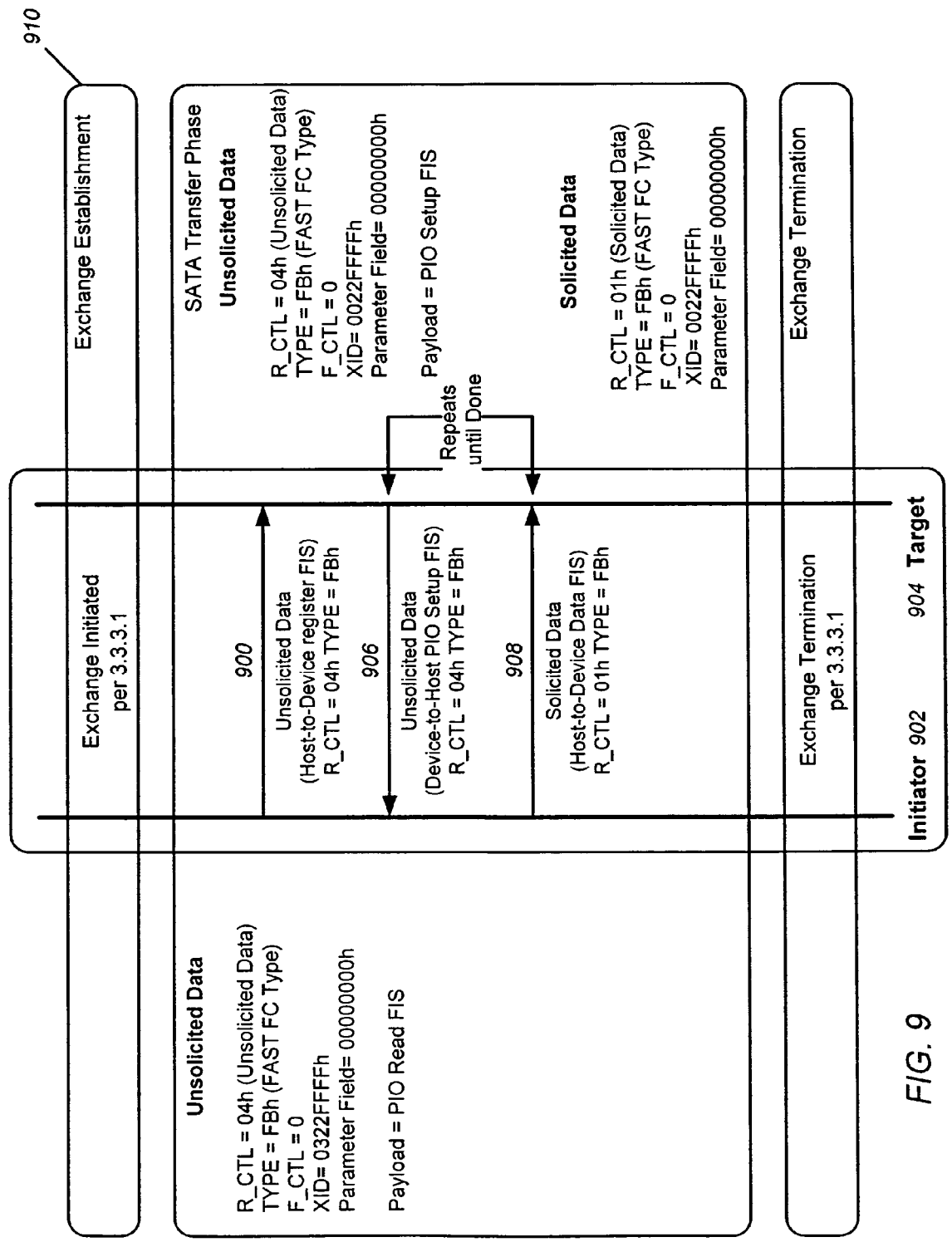
FIG. 9 is an exemplary illustration of a PIO read data transfer according to embodiments of the present invention.

FIG. 9 illustrates an exemplary Programmed Input/Output (PIO) read data transfer according to embodiments of the present invention. In FIG. 9, first, an exchange is established at 910 as described above. Next, an unsolicited data frame 900 containing a host-to-device register FIS is a request by the initiator 902 to perform a read operation in the target 904. The FAST switch sends back an unsolicited data frame 906 containing a device-to-host PIO setup FIS, which sets up the parameters in task file registers for the data transfer to follow. This is followed by solicited data 908. When all of the data has been transferred, the command is complete. After the last response is sent, exchange termination 912 is performed as described above.

Figure 10:
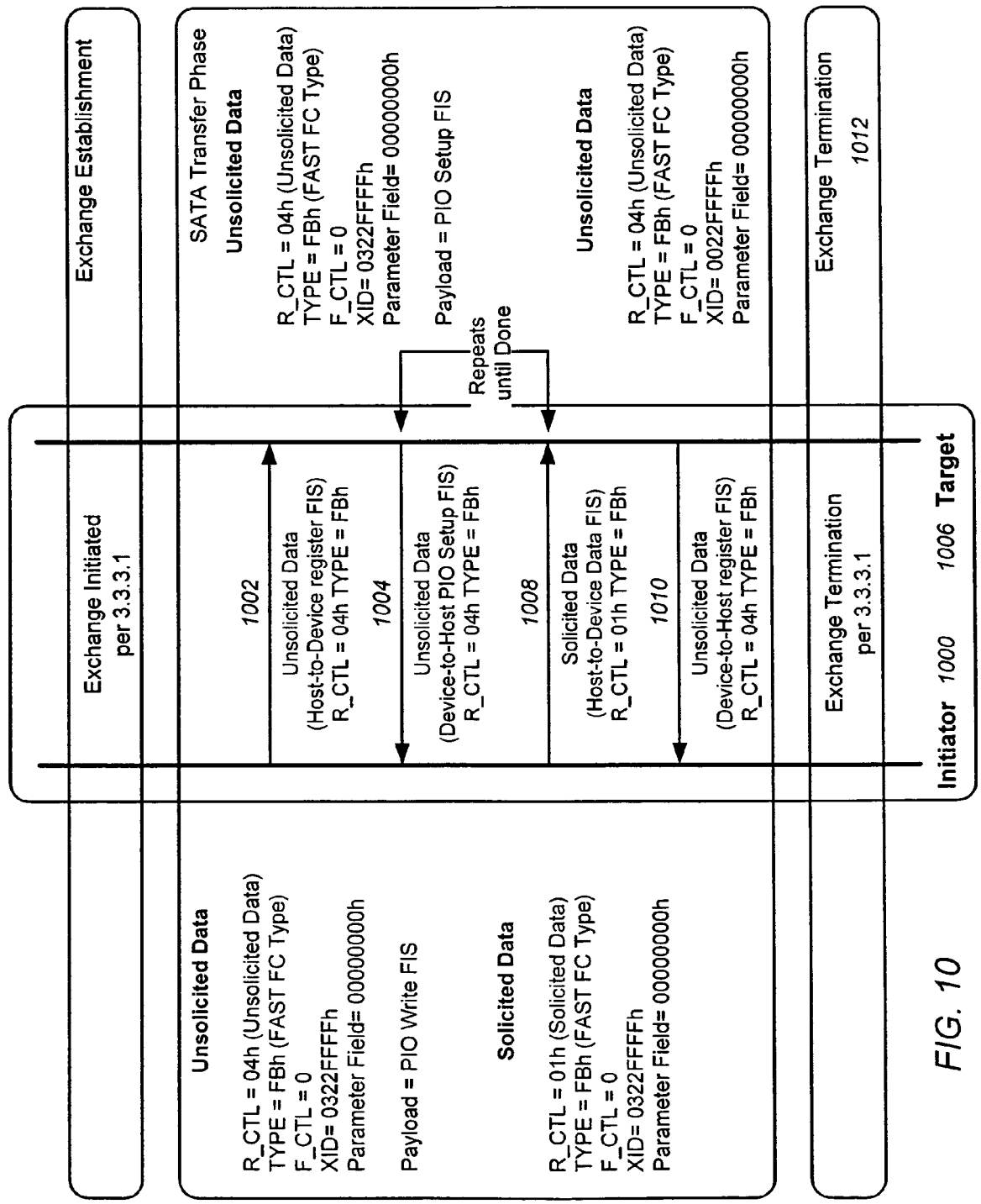
FIG. 10 is an exemplary illustration of a PIO write data transfer according to embodiments of the present invention.

FIG. 10 illustrates an exemplary PIO write data transfer according to embodiments of the present invention. In FIG. 10, first, an exchange is established at 10?? as described above. Next, the initiator 1000 sends an unsolicited data frame 1002 indicating an intention to perform a write, and the FAST switch responds with an unsolicited data frame 1004 indicating that permission is being given by the target 1006 to perform the write. The target 1000 then sends the first SATA FIS of data at 1008, and the drive responds at 1010 by indicating that the data was received. After the last data is received, the exchange is terminated at 1012.

Figure 11:
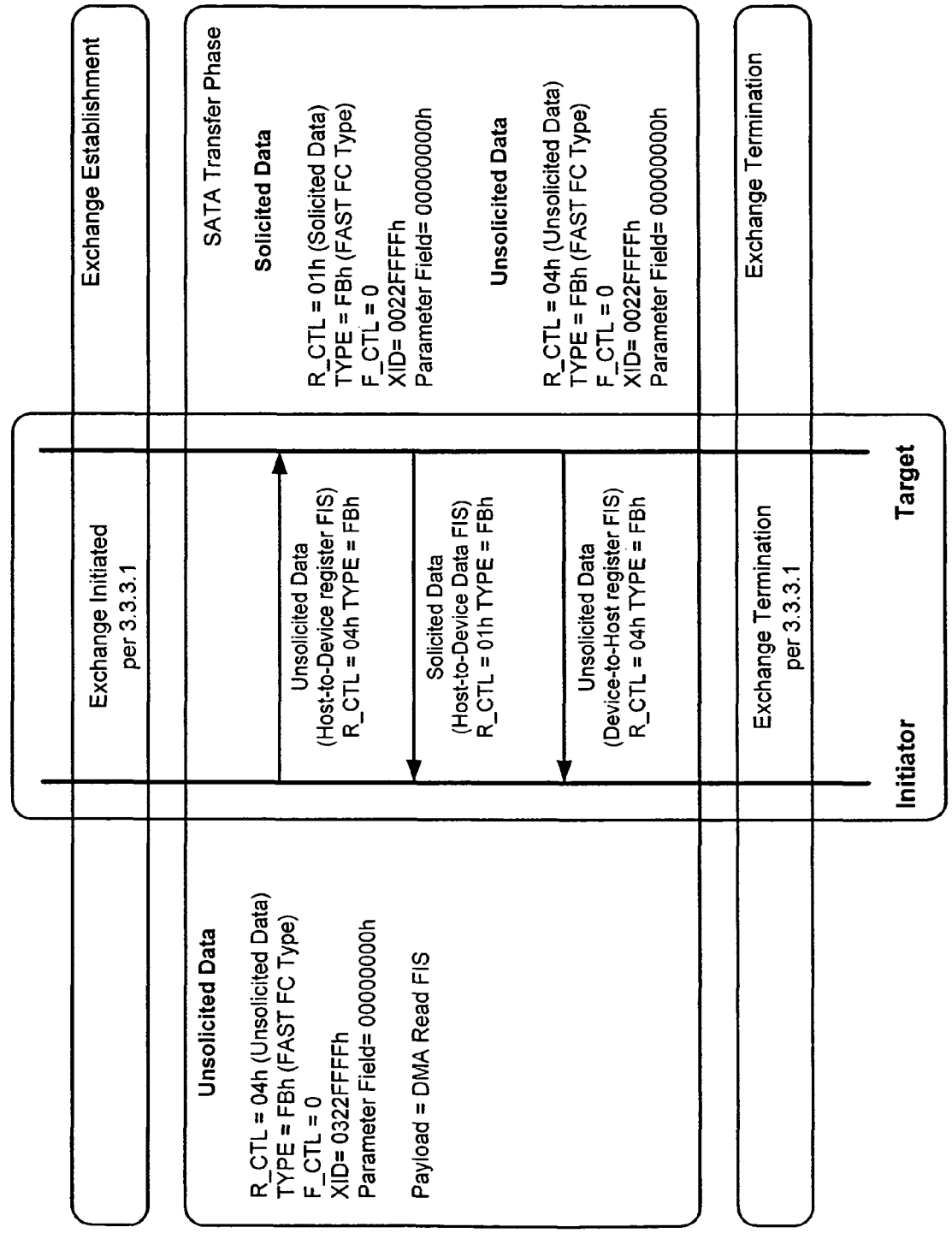
FIG. 11 is an exemplary illustration of a FAST DMA read data transfer according to embodiments of the present invention.
Figure 12:
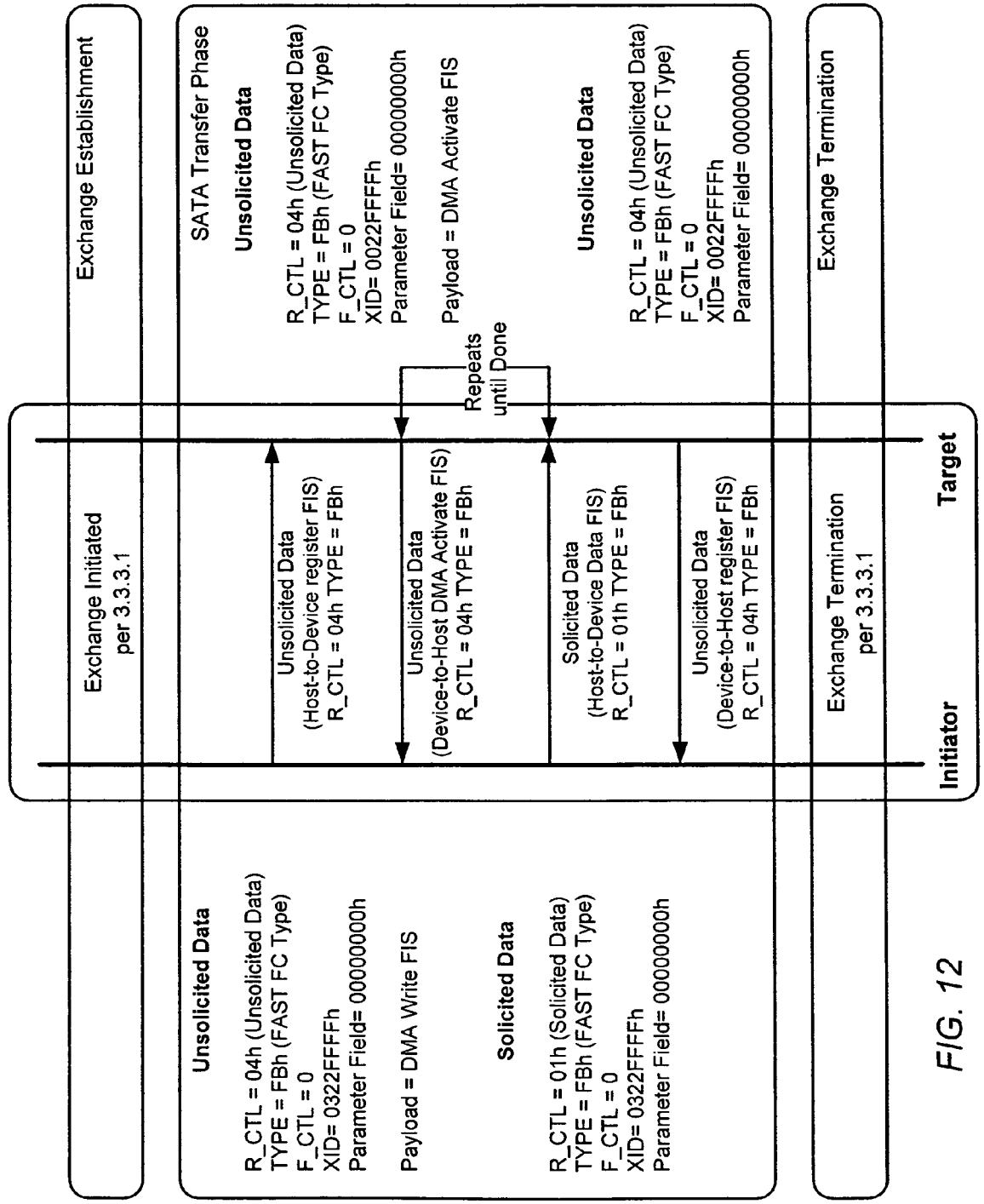
FIG. 12 is an exemplary illustration of a FAST DMA write data transfer according to embodiments of the present invention.
Figure 13:
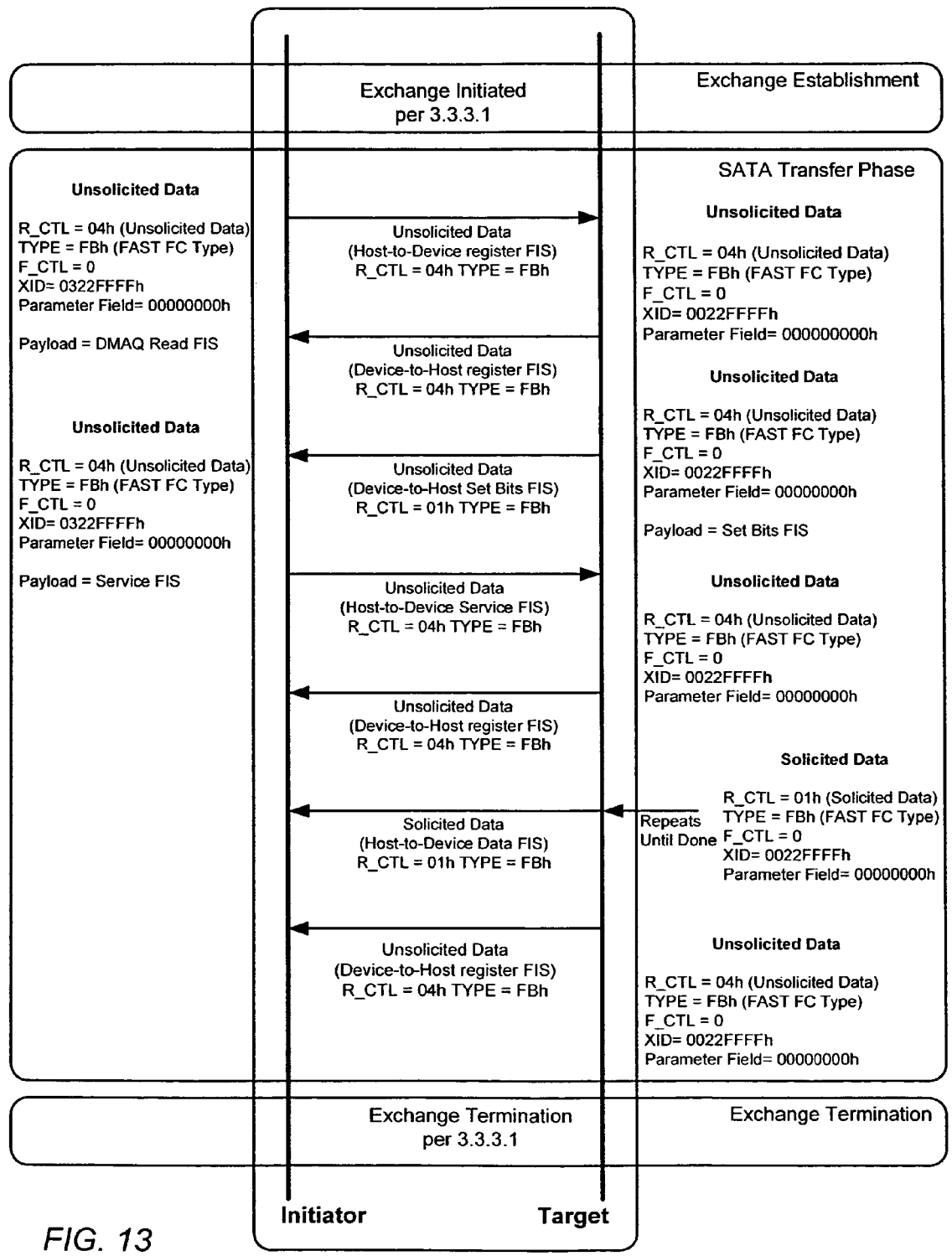
FIG. 13 is an exemplary illustration of a FAST DMAQ read data transfer according to embodiments of the present invention.
Figure 14:
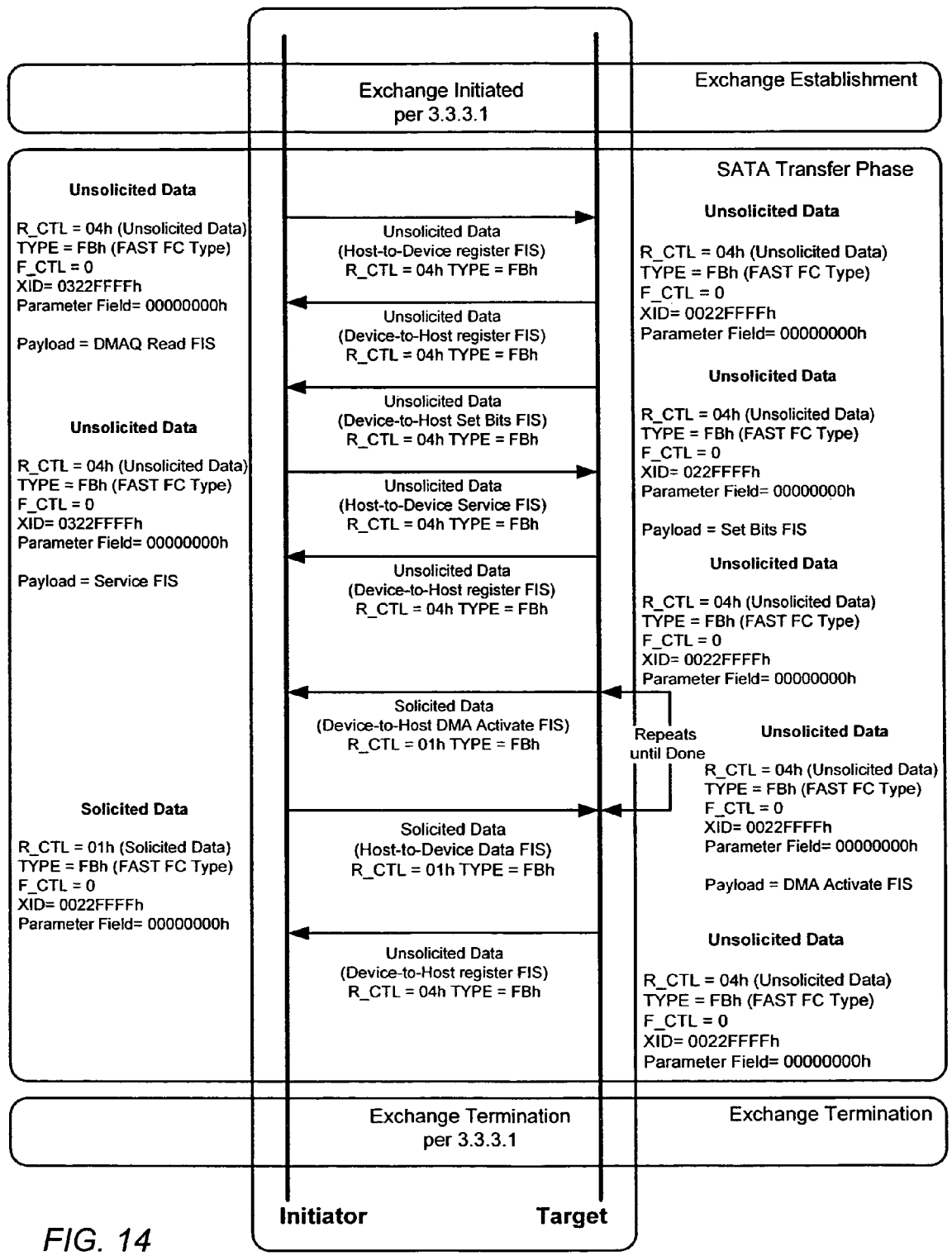
FIG. 14 is an exemplary illustration of a FAST DMAQ write data transfer according to embodiments of the present invention.

SATA provides a number of ways to perform read and write operations. One way is PIO. Another way is Direct Memory Access (DMA) (FIGS. 11 and 12), which is the most efficient way. Yet another way is Queued DMA (DMAQ) (FIGS. 13 and 14), which are FIS types 60 and 61 and are used with next generation SATA drives with native command queuing. DMAQ is an advanced form of DMA and represents another way SATA deals with reads and writes. All of the unsolicited data frames and solicited data frames are required to make it invisible to the FC network.

Frame definitions. As mentioned above, following initialization, the initiators will begin discovery of all devices in the configuration. This discovery begins with an N_PORT login, or PLOGI, which is required by the standards. The PLOGI allows two N_Ports (the initiator and the target) to establish a session and exchange identities and service parameters. Table 1 shows the frame format of the PLOGI as well as the expected values for the fields. The values shown in the table are exemplary and for reference only. Note that the node name and port name are generated by the FAST switch using the switch serial number stored in an EEPROM and the port number of the SATA drive being emulated.

TABLE 1

|  |  | PLOGI Bits | | | |
|---|---|---|---|---|---|
|  | Word | 31-24 | 23-16 | 15-8 | 7-0 |
| Header | 0 | R_CTL 22 | | Destination DID DD PPAA | |
|  | 1 | CS_CTL 00 | | Source SID DD PPAA | |
|  | 2 | Type 01 | | F_CTL 29 00 00 | |

TABLE 1-continued

|  |  | PLOGI Bits | | | |
|---|---|---|---|---|---|
|  | Word | 31-24 | 23-16 | 15-8 | 7-0 |
|  | 3 | SEQ_ID Incr | DF_CTL 00 | SEQ_CNT 00 00 | |
|  | 4 | OX_ID XX XX | | RX_ID FF FF | |
|  | 5 | PARAMETER 0000 0000 | | | |
| Payload | 0 | CMD 03 | | x00 00 00 00 00 00 | |
|  | 1 | Common Services Word 0 XX XX 00 00 | | | |
|  | 2 | Common Services Word 1 88 00 08 00 | | | |
|  | 3 | Common Services Word 2 00 FF XX XX | | | |
|  | 4 | Common Services Word 3 ED_TOV 00 00 07 D0 | | | |
|  | 5 | N_Port_Name XX XX XX XX | | | |
|  | 6 | N_Port_Name XX XX XX XX | | | |
|  | 7 | Node_Name XX XX XX XX | | | |
|  | 8 | Node_Name XX XX XX XX | | | |
|  | 9-12 | Class 1 Services Word 0-3 00 00 00 00 (4 Words) | | | |
|  | 13-16 | Class 2 Services Word 0-3 00 00 00 00 (4 Words) | | | |
|  | 17 | Class 3 Services Word 0 88 00 00 00 | | | |
|  | 18 | Class 3 Services Word 1 00 00 08 00 | | | |
|  | 19 | Class 3 Services Word 2 00 FF 00 00 | | | |
|  | 20 | Class 3 Services Word 3 00 01 00 00 | | | |
|  | 21-24 | Class 4 Services Word 0-3 00 00 00 00 (4 Words) | | | |
|  | 25-28 | Vendor Version Level Word 0-3 00 00 00 00 (4 Words) | | | |
|  |  | CRC Calculated | | | |

For PLOGI accept frames from targets to initiators, note that the following table shows the PLOGI response to a PLOGI. XX in Table 2 below is used for undefined entries per the FC standard. Those items listed as "Same as PLOGI" will use the same value provided in the PLOGI.

TABLE 2

|  |  | PLOGI_ACC Bits | | | |
|---|---|---|---|---|---|
|  | Word | 31-24 | 23-16 | 15-8 | 7-0 |
| Header | 0 | R_CTL 23 | | Destination DID SRC of PRLI | |
|  | 1 | CS_CTL 00 | | Source SID Dest of PRLI | |
|  | 2 | Type 01 | | F_CTL 98 00 00 | |
|  | 3 | SEQ_ID Incr | DF_CTL 00 | SEQ_CNT 0000 | |
|  | 4 | OX_ID Same as PLOGI | | RX_ID Same as PLOGI | |
|  | 5 | PARAMETER 0000 0000 | | | |
| Payload | 0 | CMD 02 | | x00 00 00 00 00 00 | |
|  | 1 | Common Services Word 0 XX XX 00 00 | | | |

TABLE 2-continued

| | PLOGI_ACC Bits | | | |
|---|---|---|---|---|
| Word | 31-24 | 23-16 | 15-8 | 7-0 |
| 2 | Common Services Word 1 | | | |
| | 88 | 00 | 08 | 00 |
| 3 | Common Services Word 2 | | | |
| | 00 FF | | XX XX | |
| 4 | Common Services Word 3 ED_TOV = PLOGI Value | | | |
| 5 | N_Port_Name Must be Unique for demo. | | | |
| 6 | N_Port_Name Must be Unique for demo. | | | |
| 7 | Node_Name Must be Unique for demo. | | | |
| 8 | Node_Name Must be Unique for demo. | | | |
| 9-12 | Class 1 Services Word 0 00 00 00 00 (4 Words) | | | |
| 13-16 | Class 2 Services Word 1 00 00 00 00 (4 Words) | | | |
| 17 | Class 3 Services Word 0 80 00 00 00 | | | |
| 18 | Class 3 Services Word 1 00 00 08 00 | | | |
| 19 | Class 3 Services Word 2 00 FF 00 00 | | | |
| 20 | Class 3 Services Word 3 00 01 00 00 | | | |
| 21-24 | Class 4 Services Word 0 00 00 00 00 (4 Words) | | | |
| 25-28 | Vendor Version Level Word 0-3 00 00 00 00 (4 Words) CRC Calculated | | | |

For PRLI (FCP-2) frames from initiators to targets, note that the PRLI is second phase of discovery. The process login is used to establish and manage a session between the initiator and target. The PRLI contains the service parameters to be used for the communication. See Table 3 below.

TABLE 3

| | | FCP-2 PRLI Bits | | | |
|---|---|---|---|---|---|
| | Word | 31-24 | 23-16 | 15-8 | 7-0 |
| Header | 0 | R_CTL 22 | Destination DID DD PPAA | | |
| | 1 | CS_CTL 00 | Source SID DD PPAA | | |
| | 2 | Type 01 | F_CTL 29 00 00 | | |
| | 3 | SEQ_ID XX | DF_CTL 00 | SEQ_CNT 00 00 | |
| | 4 | OX_ID XX XX | | RX_ID FF FF | |
| | 5 | PARAMETER 0000 0000 | | | |
| Payload | 0 | CMD 20 | Pge Len 10 | Payload Length Calculated | |
| | 1 | Service Parameter Page W 0 08 RR 20 00 | | | |
| | 2 | Service Parameter Page W 1 00 00 00 00 | | | |
| | 3 | Service Parameter Page W 2 00 00 00 00 | | | |
| | 4 | Service Parameter Page W 3 00 00 03 A2 CRC Calculated | | | |

For PRLI_Reject (FCP-2) frames from targets to initiators, note that because non-FAST IOCs may be connected to FAST based enclosures, it is important to provide a mechanism to stop the non-FAST IOC from attempting to repeatedly communicate with the FAST targets. When the non-FAST IOC receives a Link Service ReJecT (LS_RJT) in response to the PRLI, the device will not be logged into the target and then not communicate with the target. See Table 4 below:

TABLE 4

| | | FCP-2 PRLI Bits | | | |
|---|---|---|---|---|---|
| | Word | 31-24 | 23-16 | 15-8 | 7-0 |
| Header | 0 | R_CTL 23 | Destination DID SRC of PRLI | | |
| | 1 | CS_CTL 00 | Source SID Dest of PRLI | | |
| | 2 | Type 01 | F_CTL 00 00 00 | | |
| | 3 | SEQ_ID FF | DF_CTL 00 | SEQ_CNT 00 00 | |
| | 4 | OX_ID Same as PRLI | | RX_ID Same as PRLI | |
| | 5 | PARAMETER 0000 0000 | | | |
| Payload | 0 | LS_Command Code 01 00 00 00 | | | |
| | 1 | Services Reject Data Def | | | |
| | | 00 | 0B | 00 | 00 |
| | 2 | CRC Calculated | | | |

For PRLI (FAST) frames from initiators to targets, note that when a FAST IOC receives the FC-4 PRLI LS_RJT, it will initiate a FAST PRLI to determine if the device is in fact a SATA device that is capable of FAST. This frame is modeled from the FC PRLI and contains all the same fields. The significant differences in the frame are the change of the type code to the FAST type code and the change of the service parameter to FAST. See Table 5 below.

TABLE 5

| | | FCP-2 PRLI bits | | | |
|---|---|---|---|---|---|
| | Word | 31-24 | 23-16 | 15-8 | 7-0 |
| Header | 0 | R_CTL 22 | Destination DID DD PPAA | | |
| | 1 | CS_CTL 00 | Source SID DD PPAA | | |
| | 2 | Type 01 | F_CTL 29 00 00 | | |
| | 3 | SEQ_ID XX | DF_CTL 00 | SEQ_CNT 00 00 | |
| | 4 | OX_ID XX XX | | RX_ID FF FF | |
| | 5 | PARAMETER 0000 0000 | | | |
| Payload | 0 | CMD 20 | Pge Len 10 | Payload Length Calculated | |
| | 1 | Service Parameter Page W 0 FB RR 20 00 | | | |
| | 2 | Service Parameter Page W 1 00 00 00 00 | | | |
| | 3 | Service Parameter Page W 2 00 00 00 00 | | | |
| | 4 | Service Parameter Page W 3 00 00 00 22 | | | |
| | 5 | CRC Calculated | | | |

The service parameter page for FAST PRLI and Response is as follows in Table 6 below.

TABLE 6

| FCP service parameter | Word | Bit |
| --- | --- | --- |
| Reserved | 0 | 31-0 |
| Reserved | 1 | 31-0 |
| Reserved | 2 | 31-0 |
| Reserved | 3 | 31-6 |
| Initiator Function | 3 | 5 |
| Target Function | 3 | 4 |
| Reserved | 3 | 3-0 |

For PRLI_Accept (FAST) frames from targets to initiators, note that the FAST PRLI accept is also modeled after the PRLI accept. This frame indicates to the Host that the attaches storage is a SATA drive connected to a FAST capable switch. See Table 7 below.

TABLE 7

| | | FCP-2 PRLI bits | | |
| --- | --- | --- | --- | --- |
| | Word | 31-24 | 23-16 | 15-8 | 7-0 |
| Header | 0 | R_CTL 23 | Destination DID Source of FAST PRLI | | |
| | 1 | CS_CTL 00 | Source SID Dest of FAST PRLI | | |
| | 2 | Type 01 | F_CTL 00 00 00 | | |
| | 3 | SEQ_ID FF | DF_CTL 00 | SEQ_CNT 00 00 | |
| | 4 | OX_ID Same as PRLI | | RX_ID Same as PRLI | |
| | 5 | PARAMETER 00 00 00 00 | | | |
| Payload | 0 | CMD 02 | Pge Len 10 | Payload Length 00 2C | |
| | 1 | Service Parameter Page W 0 FB RR | | 21 00 | |
| | 2 | Service Parameter Page W 1 00 00 00 00 | | | |
| | 3 | Service Parameter Page W 2 00 00 00 00 | | | |
| | 4 | Service Parameter Page W 3 00 00 00 12 | | | |
| | 5 | CRC Calculated | | | |

Figure 15:
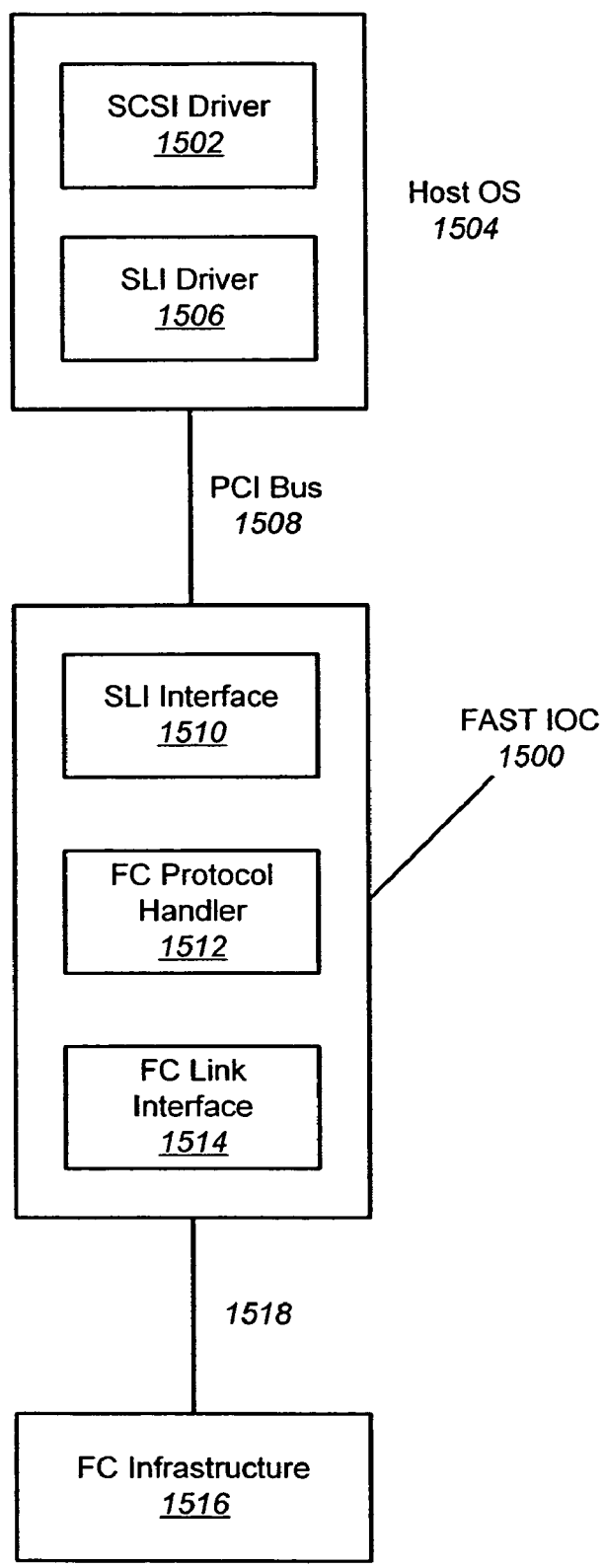
FIG. 15 is an exemplary illustration of a simplified view of a FAST IOC according to embodiments of the present invention.

FC I/O Controller. FIG. 15 is a simplified view of a FAST IOC 1500 (e.g. FAST IOC 304 in FIG. 3) according to embodiments of the present invention. Host OS 1504 (e.g. processor 326 in FIG. 3) includes a SCSI driver 1502 provided by the host OS 1504 and a Service Level Interface (SLI) driver 1506 written for the particular host OS type. A PCI bus 1508 (or alternatively a PCI-X bus or a PCI Express bus (PCIe)) connects the host OS 1504 to the FAST IOC 1500. Within the FAST IOC 1500 is an SLI interface 1510, which communicates across the PCI bus 1508 with the SLI driver 1506. A FC protocol handler 1512 handles FC only, and a FC link layer interface 1514 sends and receives FC frames. The FC link layer interface 1514 is connected over a FC link 1518 to FC infrastructure 1516, which may include switches, FC devices, FAST devices and the like.

Figure 16:
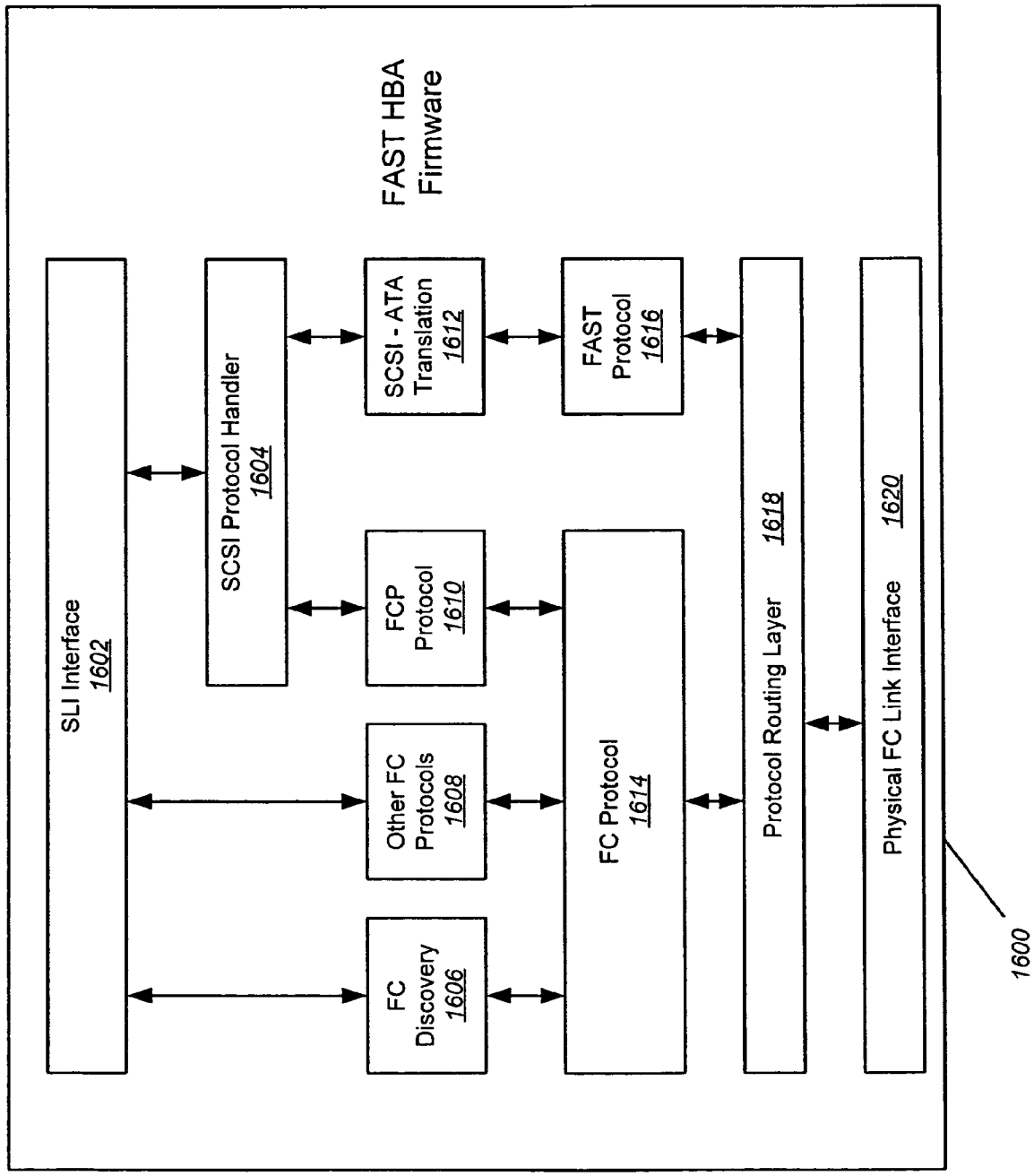
FIG. 16 is an exemplary illustration of a more detailed drawing of a FAST IOC according to embodiments of the present invention.

FIG. 16 is a more detailed drawing of a FAST IOC 1600 according to embodiments of the present invention. The FAST IOC 1600 is a multi-protocol IOC, compared to conventional IOCs which handle only a single protocol (e.g. SCSI). The FAST IOC 1600 is able to determine which protocol a particular FC frame is encapsulating (e.g. SCSI or SATA), route FC frames, etc. The FAST IOC 1600 also performs SCSI to ATA translation, which makes a SATA disk in the FC infrastructure appear to be a SCSI disk. This enables pre-existing FC drivers, SLI interfaces and infrastructure to communicate with SATA drives without requiring changes to the O/S driver stack.

The blocks in the FAST IOC 1600 in FIG. 16 represent firmware operations. The SLI interface 1602 handles communication between the host OS driver and the remainder of the FAST IOC 1600. The SLI interface 1602 is the communication pathway between the driver software running on the host processor (see reference character 1506 in FIG. 15) and the firmware running on the FAST IOC's embedded processor. Typically, the SLI interface 1602 maps across a PCI-like interconnect between the host and the FAST IOC 1600. The SLI interface 1602 provides the low-level data structures and signaling procedures used to transfer control and payload data into and out of host memory. The SLI procedures also allow a level of synchronization to be achieved between the FAST IOC 1600 and host when this is necessary for proper FAST IOC operation. The SLI interface 1602 itself does not actually process any of the host requests, but instead routes these requests to other blocks in the FAST IOC firmware for processing. The SLI interface 1602 also supports the transport of SCSI command traffic from the host OS to the FC SAN. Modern operating systems generally provide a standard mechanism for user space applications to interact with SCSI devices, independent of the transport mechanism utilized to communicate with the SCSI device. The SCSI specific parts of the SLI specification provide mechanisms tailored to translate between the operating systems model of SCSI command traffic and the corresponding IOC model of SCSI command traffic. The SLI interface and IOC firmware is specifically designed to support the efficient transport of SCSI command traffic without burdening the host processor with the transport level operations. By presenting the ATA devices to the host as if they were SCSI devices and then performing a SCSI-to-ATA conversion step it is possible to leverage the existing SLI interface and driver stack. The SCSI protocol handler 1604 manages the transport-independent aspects of SCSI protocol handling. Much like in the operating system itself, the processing of SCSI commands can be viewed as independent from the mechanisms used to transport the SCSI commands. In a multi-protocol FAST IOC 1600, the FAST IOC itself has more than one mechanism to transport SCSI command traffic. Therefore, to avoid duplicated processing, an abstraction at the SCSI layer is created in the FAST IOC 1600 that performs SCSI processing that is independent of a specific transport protocol. The SCSI protocol handler 1604 handles all of the processing common to both of the SCSI transport protocols in multi-protocol FAST IOC 1600. In the FAST firmware the SCSI protocol handler 1604 has been abstracted more thoroughly to make it transport independent. This is a necessary step to make the FAST IOC 1600 capable of handling multiple transport protocols. The SCSI protocol handler 1604 takes care of processing the aspects of SCSI command transport that are common to the SCSI transport protocols supported by the multi-protocol FAST IOC 1600.

The FC discovery block 1606 manages the discovery of devices on the attached FC network, including both FAST and FC devices. The discovery process for FC involves a number of steps to first determine the topology of an attached FC SAN and then further discover specific endpoints in the SAN that can support SCSI transactions using the FCP or FAST transport protocols. Identified devices are then presented to the operating system SCSI layer as possible SCSI endpoints that the operating system could use for SCSI I/O. In the case of the FAST IOC 1600, more of the discovery process is moved out of the driver and into the FAST IOC so that the discovery of FAST-capable devices is transparent to the host driver. The role of the FC discovery block is to handle the additional discovery capabilities required by a FAST IOC. The FC discovery block 1606 has been modified to perform more of the discovery process in the firmware. This makes it possible to integrate the FAST protocol without requiring a change to the OS driver. Not requiring a change to the host-driver is quite valuable considering the wide variety of platforms within which a standard IOC is employed. The other FC protocol block 1608 manages additional FC protocols such as FIbre CONnectivity (FICON), Internet Protocol (IP) over FC (FCIP), and the like. The additional FC protocols are native Fibre Channel protocols that do not transport SCSI command traffic. These protocols are routed and processed using mechanisms already defined in the Fibre Channel specification. The FC protocol block handles all of the non-SCSI transport protocols that are supported by the typical FC IOC. The Fibre Channel Protocol (FCP) protocol block 1610 manages the transport of SCSI traffic across a FC transport. The Fibre Channel Protocol (FCP) is the protocol used to transport SCSI command traffic between the FC IOC and existing FC SCSI devices. The FCP protocol block handles the FC frame exchanges needed to transport SCSI command traffic using the legacy FC infrastructure. The SCSI-ATA translation block 1612 translates between the SCSI and ATA command sets. This allows SATA devices to be presented to the OS as SCSI devices, and alleviates the need to modify existing drivers to handle the ATA command set.

The FC protocol block 1614 performs low-level FC protocol frame handling. The FAST protocol block 1616 provides low-level FAST protocol frame handling and encapsulates SATA FISs into FC frames, or de-encapsulates SATA FISs from FC frames. The FAST protocol block 1616 is responsible for handling the connection (dual-exchange) management and frame processing associated with the FAST protocol. The protocol routing layer 1618 routes traffic to the appropriate protocol stack, and has been augmented in the FAST firmware to handle the routing of the connection-oriented FAST protocol. For example, if a frame is a FAST frame, it is sent to the FAST protocol block 1616, and if it is a FC frame, it is sent to the FC protocol block 1614. The physical FC link interface block 1620 transmits and receives frames on the FC network.

Figure 17:
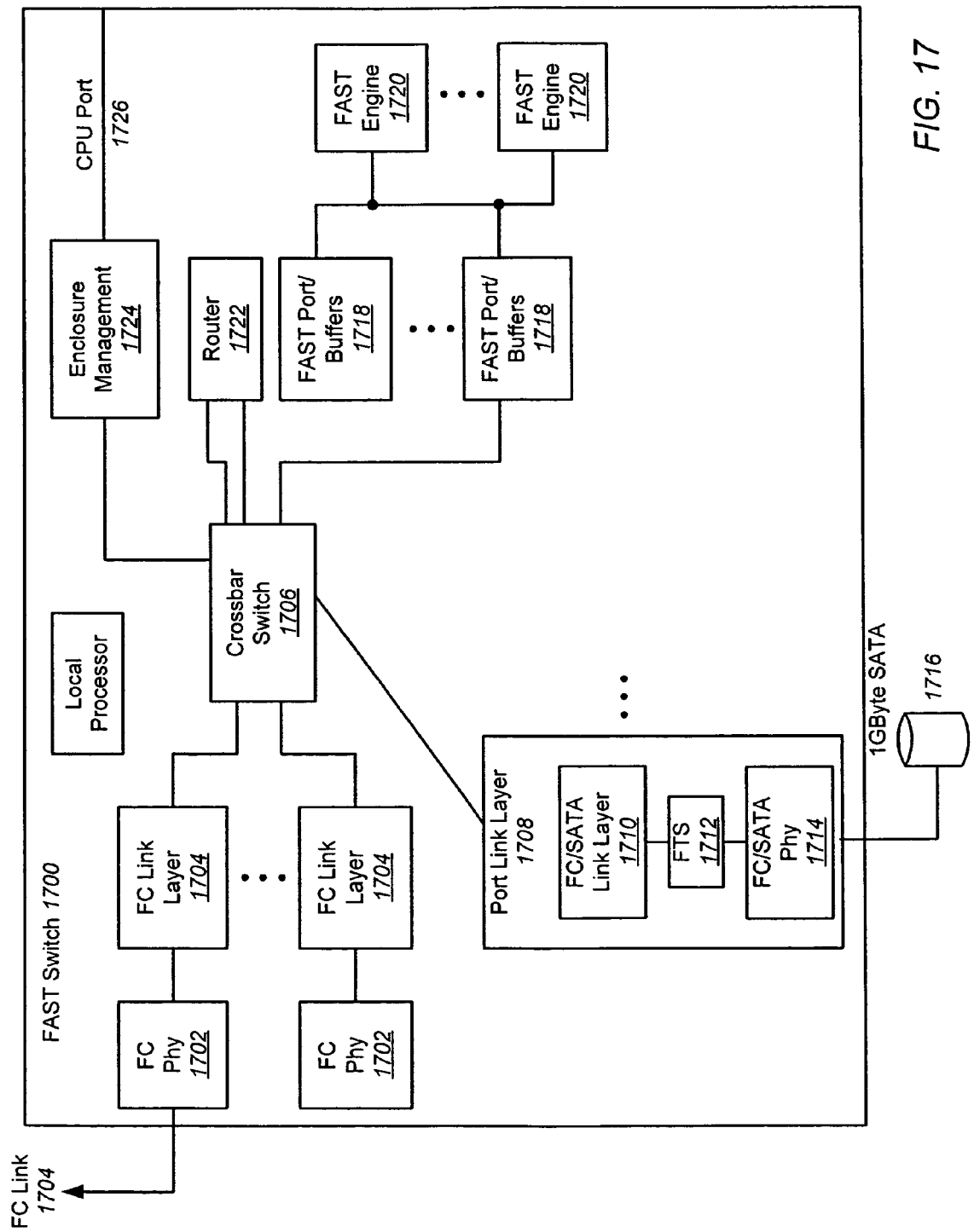
FIG. 17 illustrates an exemplary FAST switch resident in a FAST disk drive enclosure (not shown) according to embodiments of the present invention.

The FAST switch. FIG. 17 illustrates an exemplary FAST switch 1700 resident in a FAST disk drive enclosure (not shown) according to embodiments of the present invention. The FAST switch 1700 contains a number of FC Phy 1702 and FC link layers 1704 for interfacing with the FC ports on one or more RAID controllers over a FC link 1704. The FC Phy 1702 and FC link layers 1704 handle all the primitives in FC. These layers monitor received FC primitives, modifying the active switch matrix connections in response to traffic going across the FC link. The FC link layers 1704 are connected to a crossbar switch 1706, which is also connected to a number of port link layers 1708 for connecting to either a FC device or a SATA device. The crossbar switch 1706 operates in FC Arbitrated Loop (FC_AL) space, and performs a switching function. It uses the FC Arbitrated Loop Physical Address (AL_PA) and OPN ordered sets to determine the destination of a connection request, and makes a connection across the crossbar switch to the target device.

Each port link layer 1708 includes a FC/SATA link layer 1710, a FC Tunneling SATA (FTS) layer 1712, and a FC/SATA Phy 1714. The FTS layer 1712 contains logic which detects whether the port link layer 1708 is connected to a SATA drive by detecting SATA ordered sets, and determines the status of the SATA drive. The FC/SATA Phy 1714 are connected to SATA or FC drives 1716.

Also connected to the crossbar switch 1706 are FAST port/buffers 1718 coupled to the crossbar switch 1706 and one or more (e.g. four) FAST engines 1720. The FAST engine 1720 contains a full SATA core (and a Register Transfer Level (RTL) state machine) that understands the lower levels of the SATA protocol. The FAST engines 1720 are viewed as initiators to the SATA drives 1716. Note that because it would take up too much space to have a FAST engine and buffers for each port, a reduced number of FAST engines and buffers are shared between the port link layers 1708. A small OS generation and detection circuit in the FC link layer 1704 is used to keep the SATA drive interface serviced. The OS generator sends ALIGN characters to the SATA drive when not connected to the SATA link-layer in one of the FAST engine blocks. The detection circuit determines when the SATA drive is making a request that requires servicing by the SATA link-layer block in the FAST engine and passes the request to the router 1722 to request a connection. The router 1722 is connected to the crossbar switch 1706 and makes routing decisions within the crossbar switch 1706. Also connected to the crossbar switch 1706 is an enclosure management function 1724 controllable by a CPU port 1726. The CPU port is a path to allow a processor to monitor FC frames locally.

To handle the FC protocol for the SATA targets, the FAST switch will take a FC address for each SATA device connected to a port (this would be an ALPA for FC_AL topologies and a Destination IDentifier (D_ID) for Fabric or Point-point topologies) during the initialization sequence. The FAST engine will also respond to all PLOGIs and PRLIs and will generate a Fabric LOGIn (FLOGI) if a fabric is present. The FAST engine knows from the presence of ALPA 00 that a fabric is present. The logins will identify the targets as SATA devices. This allows a tunneling capable initiator to discover the devices and initiate a SATA connection to them. All non ATA commands will be directed to the CPU port for analysis and response. Using the CPU port to process the FC login commands allows the flexibility of firmware to handle error and out of bound conditions.

The FAST port/buffers 1718 are notified by the FAST engine 1720 that there is an active SATA drive attached, and perform several functions. During FC loop initialization, the FAST port/buffers 1718 take an AL_PA to reserve an address in the FC_AL subsystem. The FAST port/buffers 1718 act as a FC target and receive FC primitives, OPNs, ARBitrates (ARBs), IDLEs, LIPs and frames, and generate and send OPNs, ARBs, LIPs, and frames back to the initiator to make it appear to the FC port like a virtual disk drive. The FAST port/buffers 1718 also terminate all FC frames coming across the FC link, handle all the FC protocols, and put the data into a First In First Out (FIFO) buffer for subsequent processing by the FAST engine 1720. The FAST port/buffers 1718 can also be statically configured by setting a bit to support either standard FC or SATA-encapsulated FC frames, and thus can be connected to either FC or SATA drives. The FAST port/buffers 1718 also have buffers to translate from FC speeds to SATA speeds and perform speed matching with the drives.

SATA supports up to an 8 k frame size. In order to transfer the SATA frames through FC environment, the SATA frames must be divided into the negotiated FC frame size. This is accomplished by filling a FC buffer in the FAST port/buffers 1718 and then sending a HOLD to the SATA target until another FC buffer is available. When the FC buffer is available, the HOLD is released and additional data is received from the SATA device. This facility requires that the FAST switch increment the SEQuence IDentifier (SEQ_ID) on each frame of a response to detect out of order and lost frame tracking by the initiator. When data is being received on the FC side destined for the SATA device, the data will come in as the negotiated frame size where it will be assembled into the proper SATA frame sizes. If the entire SATA frame is not available to send to the target, a HOLD is sent to the target until the next frame is received from FC interface or the last sequence of the exchange is received.

The FAST engines 1720 emulate the host initiator to the SATA drive 1716, and take the data out of the FIFO buffer (in the case of data going from the initiator to the SATA drive). The FAST engines 1720 also check incoming frames to determine if they are valid SATA frames to be passed on to the SATA drive 1716, if it is a PLOGI frame that needs to be responded to (low level responses) without involvement of the driver, or if it is a frame that the FAST engine does not recognize and must send to the CPU port for the processor to handle on an exception basis.

When a SATA drive 1716 is ready to transfer data, the SATA drive sends a Transmit (Tx) Receiver ReaDY (R_RDY) ordered set to the port link layer 1708, indicating that data is ready to be transferred. However, if the FAST switch is not ready to receive the data because no FAST engine 1720 is available, for example, the FTS 1712 detects this condition and continues to send an idle character to the SATA drive, which will not start sending data until R_RDY ordered sets are sent, signaling it is okay to start transmitting data back to the FAST switch. When a FAST engine 1720 becomes available, the FTS 1712 sends a routing request to the router 1722 (who knows from the discovery process that the requestor is a SATA drive 1716), requesting that the SATA drive be connected to a FAST engine 1720. When a FAST engine 1720 is assigned, the FAST engine becomes the initiator to the SATA drive (the target). Because SATA is a point-to-point protocol, SATA believes there is only the initiator and the target, nothing else. In effect, there is no addressing, because none is needed.

SATA targets are designed to be controlled by a single initiator. In order to use these devices in a multi-initiator environment, an affiliation method is deployed. The affiliation method allows for simplicity, since the FAST switch is not required to maintain context for each I/O and routes all responses to the initiator that is identified by the affiliation. Enough context is required to correctly identify the ATA response with the SCSI frame. The description of this is addressed in the context section below.

Affiliations can be used differently in loop environments and fabric environments. In a fabric environment, the initiator first sends an affiliation frame to the target. The FAST switch receives this frame and generates a response frame that contains a field indicating the position in the requester stack assigned to that requester. If the requester field is 0 then the initiator owns the affiliation and may send multiple requests to the target. If the requestor field is >0 then the initiator must not send requests to the drive and all such requests will be discarded. If the requestor field is full, then the initiator is not given a reserved position in the affiliation stack and must try again later.

Once the point-to-point connection is made, the FAST engine 1720 is responsible for accepting the responses from the SATA drive 1716, performing all the handshaking with the SATA drive, encapsulating the received data (e.g. data in response to a read request) into FC frames along with the proper context for the response, and storing the encapsulated FC frames into the FAST port/buffers 1718. The FAST engine 1720 tracks that the request came in from a particular device with a particular OXID, Source Identifier (S_ID) and D_ID. The FAST engine 1720 utilizes this context information to build FC frames, move completed FC frames (having the SATA FIS encapsulated within) to the FAST port/buffers 1718 and ensure that the response is sent to the right place, using the correct exchange, and in the proper sequence. The SATA core in the FAST engine 1720 is also responsible for telling the drive 1716 to hold off if the FAST port/buffers 1718 are full.

When multiple FC frames have been built and stored in the FAST port/buffers 1718, and either all buffers are full or the SATA response is complete and a complete exchange is stored, the buffer state machine makes a routing request to the router 1722, who has access to the context of the response and knows who the initiator is, to route the FC frames out of a FC Phy 1702 connected to the initiator.

The FAST engines are also used in a similar manner to fill the frames for write commands to the SATA drives.

When the current initiator is finished sending requests or has expired the associated timer, a close affiliation frame is generated which removes the affiliation at the completion of all pending I/Os. The tunnel device then sends an affiliation removal accept following the completion of the last outstanding I/O. Affiliations may also be closed by the FAST switch, to facilitate fairness between the multiple initiators. To close and affiliation, the FAST switch generates an affiliation close frame to the initiator if it desires to close the affiliation and allow another initiator access to the target. Upon receipt of the affiliation close, the initiator stops sending I/O requests and forwards an affiliation close frame. All outstanding I/Os will be complete and an affiliation close accept is returned to the initiator before removing the affiliation.

In a private environment the affiliations are handled automatically. In this configuration, the first initiator to send an I/O request receives the affiliation. This affiliation is kept open for as long as the initiator has outstanding I/Os to the target, or has expired the associated timer. Upon completion of the last outstanding I/O, the affiliation is automatically closed. The initiator can close an affiliation by not sending additional I/Os to the target and allow the outstanding I/Os to complete. If a second initiator sends an open to the target, the target will respond with a close. The FAST engine may place the ALPA of the initiator into the requestor stack and when an affiliation is available, sends a full duplex open to the initiator. An affiliation close frame is still used to allow the target to break an affiliation. In this case, the target generates an affiliation close frame to the initiator if it desires to close the affiliation and allow another initiator access to the target. Upon receipt of the affiliation close, the initiator stops sending IO requests and the affiliation is closed when all remaining IOs complete. The fabric affiliation method may also be used in private mode if desired.

Upon removal of an affiliation, the current affiliation owner is removed from the affiliation stack. An affiliation response frame is generated and sent to the next highest priority member of the affiliation stack with an affiliation field of 0 and the cycle is repeated.

Figure 18:
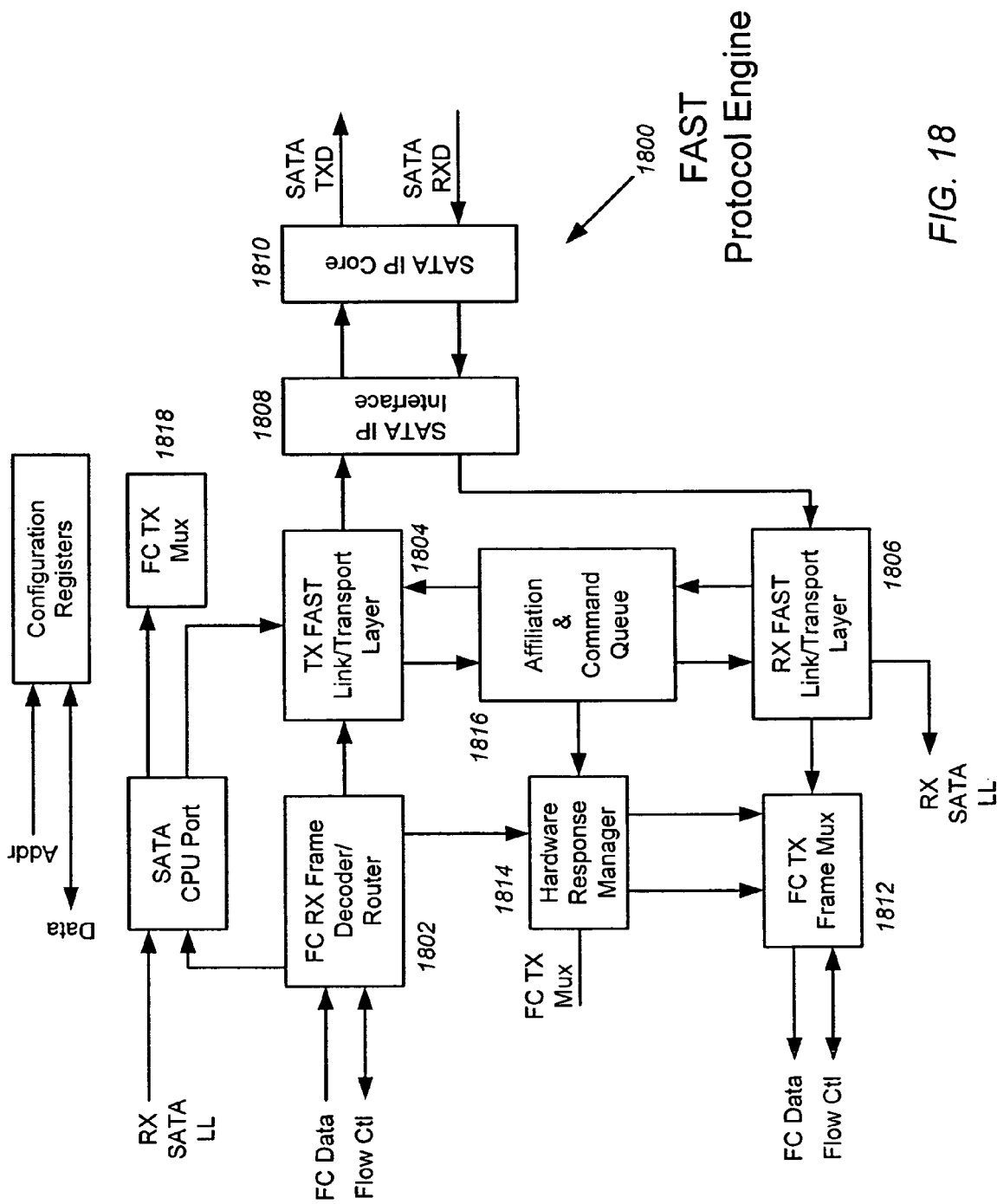
FIG. 18 is an exemplary illustration of a FAST engine according to embodiments of the present invention.

FIG. 18 illustrates an exemplary FAST engine 1800 according to embodiments of the present invention. In FIG. 18, the FC Receiver (Rx) frame decoder/router 1802 checks received frames and dispositions them as described above. The FC Rx frame decoder/router 1802 checks the frame R_CTL and Type fields to determine where to route the received frame. Routing of all frame types may be selectable via hardware registers to allow hardware generated responses, routing tunneled frames to the SATA IP core 1810 or firmware processing via a SATA processor port.

If the frame is a valid SATA-encapsulated FC frame to pass on to a SATA drive, the frame is sent to the Tx FAST Link/Transport Layer block 1804, where it is processed at a higher level to set up an active exchange between the host initiator and the virtual target. The Tx FAST Link/Transport Layer block 1804 also de-encapsulates the FC frame and strips off and maintains the context information, and sends the SATA FISs to the SATA IP interface block 1808 and a SATA IP core 1810. The SATA IP interface block 1808 contains any glue logic required to tie the SATA IP core 1810 into the design. Among features supported is resetting targets on non-stealth LIPs, aborting the transmit requests on errors, etc. The SATA IP core 1810 contains the physical and link layer logic for interfacing to SATA devices, sorts the SATA ordered sets, makes sure the spacing between frames is correct, and processes holds and hold acknowledgements and other low level SATA protocols.

The hardware response manager block 1814 offloads the FAST switch's local processor by generating response frames to many FC commands. Unrecognized frames are routed through the CPU port to the local processor to be resolved. This block will respond to at least the frames listed below:

| IOC-Generated Frames | FAST Engine Response Frames |
| --- | --- |
| FLOGI | LS_ACC (Class 3 info only) |
| PLOGI | LS_ACC (Class 3 info only) |
| PRLI | LS_ACC (Type code is TBD) |
| Command w/o available affiliation | P_RJT/F_RJT (Port busy, reason is N_PORT busy) |
| Command not supported | P_RJT/F_RJT ( ) |

Transaction specific fields (D_ID, S_ID, OXID, etc) are read from all received frames to allow insertion in the proper fields of the response frame. A response frame request may be generated by either the FC Rx frame decoder/router 1802 as a canned response to a known received frame type or by the affiliation and command queue manager block 1816 to indicate busy conditions. While each FAST engine contains its own Hardware Response Block control circuitry, the data for these frames is held in a module shared by all the FAST engines to save gates. Note that only a small number of FAST engines are used to save gates. Because the router connects requests to/from SATA ports on a first-come, first-served basis, the FAST engine associated with a particular request probably will not be the port that the response is returned through. Thus, a shared context table must be maintained so all FAST engines can correctly store and/or generate the appropriate headers for the FC frames.

When a response is returned from the SATA drive, the context can be associated with the return data so that it can be routed back through the FC fabric to the initiator. In other words, the Tx FAST Link/Transport Layer block 1804 opens the FC exchange structure and keeps track of the context of all frames being sent to the drives, so that when a response comes back from a drive, the Tx FAST Link/Transport Layer block 1804 can put the context back into the FC frame wrapper. Tx FAST Link/Transport Layer block 1804 monitors the received FC frames, and after verifying a valid Cyclic Redundancy Check (CRC) on the frame, the logic accesses the affiliation and command queue manager block 1816 to determine if the frame is part of a transaction with an existing affiliation, and if not already affiliated, whether an affiliation is available.

If an affiliation already exists, the logic verifies this frame is the next frame in the sequence. If so, the frame is passed to the SATA IP interface 1808 to be forwarded on to the target device, and the status of the transaction is sent to the affiliation and command queue manager block 1816 to update the database. Because FAST protocol engines 1800 are dynamically assigned, transaction information that spans more than one frame is passed through the affiliation and command queue manager 1816 for storage in the shared database, accessible by all FAST engines. If the received FAST frame is not the next frame in the sequence, the frame is discarded. If an affiliation doe not exist for the requested transaction, an affiliation is created, if possible. Otherwise, the frame is discarded and a reject response is generated via the hardware response manager block 1816.

In the case of a write, once all the data has been written to the SATA drive, the SATA drive sends a "status good" response through the SATA IP core 1810 and the SATA IP interface 1808 back to the Rx FAST link/transport layer 1806, which retrieves the context information and sends it out through the FC Tx frame multiplexer 1812 as a FC frame back to the host, indicating to the host that the write is complete. The Rx/FAST link/transport layer 1806 uses the received FIS to get affiliation information. The stored FC fields are used to generate the FC frame. The module also checks and generates CRCs as part of receive/retag operation. If a bad CRC is received from the disk, the CRC generator will generate a bad CRC, passing the error handling responsibility up to host. Additionally, this block will delete affiliations from affiliation/command queue manager after status has been sent.

The Tx FAST Link/Transport layer block 1806 and FC Tx frame mux blocks can also detect corrupted frames and pass them to a local processor to handle as an exception, and the local processor can send frames down to the SATA as needed to do some background work.

The FC TX Mux block 1818 selects between the various sources of data to send the desired data to the FAST Port interface.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. In a multi-protocol Input/Output Controller (IOC) couplable to a host processor over a custom interface and couplable to Serial Advanced Technology Attachment (SATA) devices and Fibre Channel (FC) devices over a FC link, one or more IOC processors programmed for assisting in enabling the SATA devices to be utilized in a FC Storage Area Network (SAN) by performing the steps of:
   receiving Small Computer System Interconnect (SCSI) commands from the custom interface when the SCSI commands are to be sent out over the FC link;
   translating the SCSI commands into SATA command sets including SATA Frame Information Structures (FISs);
   encapsulating the SATA Frame Information Structures (FISs) into FC frames to be sent out over the FC link to the SATA devices, wherein the SATA FISs are de-encapsulated from the FC frames at a switch associated with the SATA devices; and
   for all FC frames received from the FC link, distinguishing the FC frames that contain SCSI commands from the FC frames that encapsulate SATA FISs, performing low-level FC protocol handling for the FC frames detected to be encapsulating SCSI commands, and performing dual-exchange connection management and frame processing for the FC frames detected to be encapsulating SATA FISs, wherein the SATA FISs are de-encapsulated from the FC frames with SATA FISs encapsulated therein.

2. The one or more IOC processors as recited in claim 1, further programmed for managing the transport-independent aspects of SCSI protocol handling.

3. The one or more IOC processors as recited in claim 1, further programmed for managing a discovery of both Fibre Channel Attached SATA Tunneling (FAST) and FC devices attached to the FC link.

4. The one or more IOC processors as recited in claim 1, further programmed for:
sending an affiliation frame to a SATA device;
sending multiple requests to the SATA device if a response frame is received from the SATA device containing a particular requestor field value indicating that an affiliation has been created;
refraining from sending any requests to the SATA device if the response frame contains a requestor field value other than the particular requestor field value; and
re-sending the affiliation frame at a later time if the requestor field is full.

5. The one or more IOC processors as recited in claim 4, further programmed for:
sending a close affiliation frame to the SATA device which removes the affiliation at a completion of all pending requests or expiration of a timer; and
terminating sending I/O requests when an affiliation close is received from the SATA device.

6. A Redundant Array of Independent Disks (RAID) controller comprising the one or more IOC processors recited in claim 1.

7. A FC SAN comprising the RAID controller recited in claim 6.

8. One or more storage media including a computer program which, when executed by one or more Input/Output Controller (IOC) processors in a multi-protocol IOC couplable to a host processor over a custom interface and couplable to Serial Advanced Technology Attachment (SATA) devices and Fibre Channel (FC) devices over a FC link, assists in enabling the SATA devices to be utilized in a FC Storage Area Network (SAN) by causing the one or more IOC processors to perform the steps of:
receiving Small Computer System Interconnect (SCSI) commands from the custom interface when the SCSI commands are to be sent out over the FC link;
translating the SCSI commands into SATA command sets including SATA Frame Information Structures (FISs);
encapsulating the SATA Frame Information Structures (FISs) into FC frames to be sent out over the FC link to the SATA devices, wherein the SATA FISs are de-encapsulated from the FC frames at a switch associated with the SATA devices; and
for all FC frames received from the FC link, distinguishing the FC frames that contain SCSI commands from the FC frames that encapsulate SATA FISs, performing low-level FC protocol handling for the FC frames detected to be encapsulating SCSI commands, and performing dual-exchange connection management and frame processing for the FC frames detected to be encapsulating SATA FISs, wherein the SATA FISs are de-encapsulated from the FC frames with SATA FISs encapsulated therein.

9. The one or more storage media as recited in claim 8, wherein the computer program, when executed by one or more IOC processors, further causes the one or more processors to perform the step of managing the transport-independent aspects of SCSI protocol handling.

10. The one or more storage media as recited in claim 8, wherein the computer program, when executed by one or more IOC processors, further causes the one or more processors to perform the step of managing a discovery of both FAST and FC devices attached to the FC link.

11. The one or more storage media as recited in claim 8, wherein the computer program, when executed by one or more IOC processors, further causes the one or more processors to perform the steps of:
sending an affiliation frame to a SATA device;
sending multiple requests to the SATA device if a response frame is received from the SATA device containing a particular requestor field value;
refraining from sending any requests to the SATA device if the response frame contains a requestor field value other than the particular requestor field value; and
re-sending the affiliation frame at a later time of the requestor field is full.

12. The one or more storage media as recited in claim 11, wherein the computer program, when executed by one or more IOC processors, further causes the one or more processors to perform the steps of:
sending a close affiliation frame to the SATA device which removes the affiliation at a completion of all pending requests or expiration of a timer; and
terminating sending I/O requests when an affiliation close is received from the SATA device.

13. In a multi-protocol Input/Output Controller (IOC) couplable to a host processor over a custom interface and couplable to Serial Advanced Technology Attachment (SATA) devices and Fibre Channel (FC) devices over a FC link, a method for assisting in enabling SATA devices to be utilized in a FC Storage Area Network (SAN), comprising:
receiving Small Computer System Interconnect (SCSI) commands from the custom interface when the SCSI commands are to be sent out over the FC link;
translating the SCSI commands into SATA command sets including SATA Frame Information Structures (FISs);
encapsulating the SATA Frame Information Structures (FISs) into FC frames to be sent out over the FC link to the SATA devices, wherein the SATA FISs are de-encapsulated from the FC frames at a switch associated with the SATA devices; and
for all FC frames received from the FC link, distinguishing the FC frames that contain SCSI commands from the FC frames that encapsulate SATA FISs, performing low-level FC protocol handling for the FC frames detected to be encapsulating SCSI commands, and performing dual-exchange connection management and frame processing for the FC frames detected to be encapsulating SATA FISs, wherein the SATA FISs are de-encapsulated from the FC frames with SATA FISs encapsulated therein.

14. The method as recited in claim 13, further comprising managing the transport-independent aspects of SCSI protocol handling.

15. The method as recited in claim 13, further comprising managing a discovery of both FAST and FC devices attached to the FC link.

16. The method as recited in claim 13, further comprising:
sending an affiliation frame to a SATA device;
sending multiple requests to the SATA device if a response frame is received from the SATA device containing a particular requestor field value;
refraining from sending any requests to the SATA device if the response frame contains a requestor field value other than the particular requestor field value; and
re-sending the affiliation frame at a later time of the requestor field is full.

17. The method as recited in claim 16, further comprising:
sending a close affiliation frame to the SATA device which removes the affiliation at a completion of all pending requests or expiration of a timer; and
terminating sending I/O requests when an affiliation close is received from the SATA device.

* * * * *